United States Patent
Wang et al.

(10) Patent No.: US 9,166,491 B2
(45) Date of Patent: Oct. 20, 2015

(54) CONVERTER SYSTEM FOR LIMITING CIRCULATING CURRENT

(71) Applicants: Chang-Yong Wang, Taoyuan Hsien (TW); Yan-Song Lu, Taoyuan Hsien (TW); Li Cai, Taoyuan Hsien (TW); Jun Chen, Taoyuan Hsien (TW); Teng Xu, Taoyuan Hsien (TW)

(72) Inventors: Chang-Yong Wang, Taoyuan Hsien (TW); Yan-Song Lu, Taoyuan Hsien (TW); Li Cai, Taoyuan Hsien (TW); Jun Chen, Taoyuan Hsien (TW); Teng Xu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 73 days.

(21) Appl. No.: 13/843,975

(22) Filed: Mar. 15, 2013

(65) Prior Publication Data
US 2014/0021937 A1    Jan. 23, 2014

(30) Foreign Application Priority Data

Jul. 19, 2012   (CN) .......................... 2012 1 0250737

(51) Int. Cl.
  *H02M 7/08*   (2006.01)
  *H02M 5/02*   (2006.01)
  *H02M 5/458*  (2006.01)
  *H02M 7/493*  (2007.01)

(52) U.S. Cl.
  CPC .............. *H02M 5/02* (2013.01); *H02M 5/458* (2013.01); *H02M 7/493* (2013.01)

(58) Field of Classification Search
  CPC ....... H02M 5/02; H02M 7/493; H02M 5/458; H02M 7/06; H02M 7/08; H02M 7/153; H01F 2038/006; H01F 38/18
  USPC ....................... 323/361, 369, 370; 363/67, 69
  See application file for complete search history.

(56) References Cited

U.S. PATENT DOCUMENTS

| | | | |
|---|---|---|---|
| 7,710,081 B2 * | 5/2010 | Saban et al. | ..................... 322/89 |
| 8,553,440 B1 * | 10/2013 | Nanut et al. | .................. 363/129 |
| 2008/0103632 A1 | 5/2008 | Saban et al. | |
| 2011/0002445 A1 | 1/2011 | Hattrup et al. | |

FOREIGN PATENT DOCUMENTS

| | | | |
|---|---|---|---|
| CN | 1059055 | 2/1992 | |
| CN | 101453171 | 6/2009 | |
| CN | 101908828 | 12/2010 | |
| CN | 103208812 | 7/2013 | |
| SE | EP-2632040 A1 * | 2/2012 | ............ H02M 7/458 |
| TW | 201145793 | 12/2011 | |
| WO | 2012038800 | 3/2012 | |

\* cited by examiner

*Primary Examiner* — Adolf Berhane
*Assistant Examiner* — Yemane Mehari
(74) *Attorney, Agent, or Firm* — Hauptman Ham, LLP

(57) ABSTRACT

A converter system includes a first converter, a second converter, and a first inter-phase transformer. The first converter is electrically connected to the second converter in parallel between a first input terminal parallel end and a first output terminal parallel end. The first inter-phase transformer is disposed at the first input side parallel terminal or the first output side parallel terminal, and the first inter-phase transformer is operable to restrain a circulating current generated by the first converter and the second converter.

16 Claims, 8 Drawing Sheets

CONVERTER SYSTEM FOR LIMITING CIRCULATING CURRENT

RELATED APPLICATIONS

This application claims priority to China Application Serial Number 201210250737.X, filed Jul. 19, 2012, which is herein incorporated by reference.

BACKGROUND

1. Technical Field Invention

The embodiment of the present invention relates generally to a system and, more particularly, to a converter system.

2. Description of Related Art

In the field of high-power wind energy generation, power requirements of the wind energy generator is continually increased. However, it is difficult to satisfy the operational requirements of a high-power wind energy generator using a single three-phase converter in view of the speed of development of the elements of a converter and cost considerations.

Converters employing a parallel structure can generate a higher current and a correspondingly high power, such that the operational requirements of a high-power wind energy generator can be satisfied. However, in a parallel structure of converters, since it is necessary to connect one side of the converters at a generator side directly and connect another side of the converters at a grid side directly, a circulating current is generated in the parallel structure, and as a result, the efficiency of the converter system is negatively affected.

SUMMARY

A converter system is provided for limiting a circulating current that is generated by connecting converters of the converter system in parallel while maintaining the efficiency of the converter system in a steady state.

One aspect of the embodiment of the present invention is to provide a converter system. The converter system comprises a first converter, a second converter, and a first inter-phase transformer. The second converter is electrically connected to the first converter in parallel between a first input side parallel terminal and a first output side parallel terminal. The first inter-phase transformer is disposed at the first input side parallel terminal or the first output side parallel terminal for limiting a circulating current generated by the first converter and the second converter.

In one embodiment of the present invention, the first and second converters comprise an input side and an output side, the input sides of the first and second converters comprise a first bridge arm, a second bridge arm and a third bridge arm respectively, the output sides of the first and second converters comprise a first bridge arm, a second bridge arm and a third bridge arm respectively, and the first inter-phase transformer comprises a first inter-phase transformer unit, a second inter-phase transformer unit and a third inter-phase transformer unit.

When the first inter-phase transformer is disposed at the first input side parallel terminal, the first, second and third bridge arms of the input side of the first converter are electrically connected to the first, second and third inter-phase transformer units of the first inter-phase transformer respectively, wherein the first, second and third bridge arms of the input side of the second converter are electrically connected to the first, second and third inter-phase transformer units of the first inter-phase transformer respectively.

When the first inter-phase transformer is disposed at the first output side parallel terminal, the first, second and third bridge arms of the output side of the first converter are electrically connected to the first, second and third inter-phase transformer units of the first inter-phase transformer respectively, wherein the first, second and third bridge arms of the output side of the second converter are electrically connected to the first, second and third inter-phase transformer units of the first inter-phase transformer respectively.

In another embodiment of the present invention, the first, second and third bridge arms of the input sides of the first and second converters comprise a first wire, a second wire and a third wire respectively, and the first, second and third bridge arms of the output sides of the first and second converters comprise a first wire, a second wire and a third wire respectively.

When the first inter-phase transformer is disposed at the first input side parallel terminal, the first wire of the input side of the first converter is winded on the upper half of the first inter-phase transformer unit in a winded direction; the second wire of the input side of the first converter is winded on the upper half of the second inter-phase transformer unit in a winded direction; and the third wire of the input side of the first converter is winded on the upper half of the third inter-phase transformer unit in a winded direction. Further, the first wire of the input side of the second converter is winded on the lower half of the third inter-phase transformer unit in a winded direction; the second wire of the input side of the second converter is winded on the lower half of the second inter-phase transformer unit in a winded direction; and the third wire of the input side of the second converter is winded on the lower half of the first inter-phase transformer unit in a winded direction.

When the first inter-phase transformer is disposed at the first input side parallel terminal, the first wire of the input side of the first converter is winded on the upper half of the first inter-phase transformer unit in a winded direction; the second wire of the input side of the first converter is winded on the upper half of the second inter-phase transformer unit in a winded direction; and the third wire of the input side of the first converter is winded on the upper half of the third inter-phase transformer unit in a winded direction; Further, the first wire of the input side of the second converter is winded on the lower half of the third inter-phase transformer unit in a winded direction; the second wire of the input side of the second converter is winded on the lower half of the second inter-phase transformer unit in a winded direction; and the third wire of the input side of the second converter is winded on the lower half of the first inter-phase transformer unit in a winded direction.

In yet another embodiment of the present invention, a parallel structure of the first converter and the second converter is a parallel back-to-back converter structure.

In still another embodiment of the present invention, the first converter and the second converters are electrically connected in parallel into a first converter parallel device. The converter system further comprises a third converter and a second inter-phase transformer. Furthermore, the third converter comprises an input side and an output side. When the first inter-phase transformer is disposed at the first input side parallel terminal, the output side of the third converter is electrically connected to the first output side parallel terminal, and the second inter-phase transformer is electrically connected between the input side of the third converter and the first inter-phase transformer for limiting a circulating current generated by the first converter parallel device and the third converter.

As mentioned above, when the first inter-phase transformer is disposed at the first output side parallel terminal, the input side of the third converter is electrically connected to the first input side parallel terminal, and the second inter-phase transformer is electrically connected between the output side of the third converter and the first inter-phase transformer for limiting a circulating current generated by the first converter parallel device and the third converter.

In yet another embodiment of the present invention, the converter system further comprises a third converter, a fourth converter, a second inter-phase transformer, and an integrated inter-phase transformer. The first converter and the second converter are electrically connected in parallel into a first converter parallel device, and the third converter and the fourth converter are electrically connected in parallel between a second input side parallel terminal and a second output side parallel terminal to be a second converter parallel device. The second inter-phase transformer disposed at the second input side parallel terminal or the second output side parallel terminal for limiting a circulating current generated by the third converter and the fourth converter. The first converter parallel device and the second converter parallel device are electrically connected in parallel between a generator side parallel terminal and a grid side parallel terminal. The integrated inter-phase transformer is disposed at the generator side parallel terminal or the grid side parallel terminal for limiting a circulating current generated by the first converter parallel device and the second converter parallel device.

In still another embodiment of the present invention, the converter system further comprises a third converter, a second inter-phase transformer, and a third inter-phase transformer. The third converter is electrically connected to the first converter and the second converter in parallel between the first input side parallel terminal and the first output side parallel terminal. When the first inter-phase transformer is disposed at the first input side parallel terminal, the second and third inter-phase transformers are disposed at the first input side parallel terminal. Wherein, the first inter-phase transformer is electrically connected between the first converter and the second converter; the second inter-phase transformer is electrically connected between the first converter and the third converter; the third inter-phase transformer is electrically connected between the second converter and the third converter, in which the first, second and third inter-phase transformers are operable to restrain a circulating current generated by each two of the converters.

In addition, when the first inter-phase transformer is disposed at the first output side parallel terminal, the second and third inter-phase transformers are disposed at the first output side parallel terminal. Wherein, the first inter-phase transformer is electrically connected between the first converter and the second converter; the second inter-phase transformer is electrically connected between the first converter and the third converter; and the third inter-phase transformer is electrically connected between the second converter and the third converter, wherein the first, second and third inter-phase transformers are operable to restrain a circulating current generated by each two of the converters.

In yet another embodiment of the present invention, the converter system further comprises a third converter, a second inter-phase transformer, and a third inter-phase transformer. Furthermore, the third converter comprises an input side and an output side. The first, second, and third inter-phase transformers comprise a first inter-phase transformer unit, a second inter-phase transformer unit and a third inter-phase transformer unit respectively. The output sides of the first, second and third converters comprise a first bridge arm, a second bridge arm and a third bridge arm respectively.

With respect to the structure, the first bridge arm of the first converter is electrically connected to the first inter-phase transformer unit of the first inter-phase transformer and the first inter-phase transformer unit of the second inter-phase transformer; the second bridge arm of the first converter is electrically connected to the second inter-phase transformer unit of the first inter-phase transformer and the second inter-phase transformer unit of the second inter-phase transformer; and the third bridge arm of the first converter is electrically connected to the third inter-phase transformer unit of the first inter-phase transformer and the third inter-phase transformer unit of the second inter-phase transformer.

In addition, the first bridge arm of the second converter is electrically connected to the first inter-phase transformer unit of the first inter-phase transformer and the first inter-phase transformer unit of the third inter-phase transformer; the second bridge arm of the second converter is electrically connected to the second inter-phase transformer unit of the first inter-phase transformer and the second inter-phase transformer unit of the third inter-phase transformer; and the third bridge arm of the second converter is electrically connected to the third inter-phase transformer unit of the first inter-phase transformer and the third inter-phase transformer unit of the third inter-phase transformer.

Moreover, the first bridge arm of the second converter is electrically connected to the first inter-phase transformer unit of the first inter-phase transformer and the first inter-phase transformer unit of the third inter-phase transformer; the second bridge arm of the second converter is electrically connected to the second inter-phase transformer unit of the first inter-phase transformer and the second inter-phase transformer unit of the third inter-phase transformer; and the third bridge arm of the second converter is electrically connected to the third inter-phase transformer unit of the first inter-phase transformer and the third inter-phase transformer unit of the third inter-phase transformer In still another embodiment of the present invention, the first, second and third bridge arms of the input sides of the first, second and third converters comprise a first wire, a second wire and a third wire respectively. With respect to the structure, the first wire of the first converter is winded on the upper half of the first inter-phase transformer unit of the first inter-phase transformer and the upper half of the first inter-phase transformer unit of the second inter-phase transformer in a winded direction; the second wire of the first converter is winded on the upper half of the second inter-phase transformer unit of the first inter-phase transformer and the upper half of the second inter-phase transformer unit of the second inter-phase transformer in a winded direction; and the third wire of the first converter is winded on the upper half of the third inter-phase transformer unit of the first inter-phase transformer and the upper half of the third inter-phase transformer unit of the second inter-phase transformer in a winded direction.

In addition, the first wire of the second converter is winded on the lower half of the first inter-phase transformer unit of the first inter-phase transformer and the upper half of the first inter-phase transformer unit of the third inter-phase transformer in a winded direction; the second wire of the second converter is winded on the lower half of the second inter-phase transformer unit of the first inter-phase transformer and the upper half of the second inter-phase transformer unit of the third inter-phase transformer in a winded direction; and the third wire of the second converter is winded on the lower half of the third inter-phase transformer unit of the first inter-phase transformer and the upper half of the third inter-phase transformer unit of the third inter-phase transformer in a winded direction.

Moreover, the first wire of the third converter is winded on the lower half of the first inter-phase transformer unit of the second inter-phase transformer in a winded direction and is winded on the lower half of the first inter-phase transformer unit of the third inter-phase transformer in a winded direction; the second wire of the third converter is winded on the lower half of the second inter-phase transformer unit of the second inter-phase transformer in a winded direction and is winded on the lower half of the second inter-phase transformer unit of the third inter-phase transformer in a winded direction; and the third wire of the third converter is winded on the lower half of the third inter-phase transformer unit of the second inter-phase transformer in a winded direction and is winded on the lower half of the third inter-phase transformer unit of the third inter-phase transformer in a winded direction.

In one embodiment of the present invention, the converter system further comprises a third converter, a second inter-phase transformer, and a third inter-phase transformer. Furthermore, the third converter comprises an input side and an output side. The first, second, and third inter-phase transformers comprise a first inter-phase transformer unit, a second inter-phase transformer unit and a third inter-phase transformer unit respectively. The output sides of the first, second and third converters comprise a first bridge arm, a second bridge arm and a third bridge arm respectively.

With respect to the structure, the first bridge arm of the first converter is electrically connected to the first inter-phase transformer unit of the first inter-phase transformer and the first inter-phase transformer unit of the second inter-phase transformer; the second bridge arm of the first converter is electrically connected to the second inter-phase transformer unit of the first inter-phase transformer and the second inter-phase transformer unit of the second inter-phase transformer; and the third bridge arm of the first converter is electrically connected to the third inter-phase transformer unit of the first inter-phase transformer and the third inter-phase transformer unit of the second inter-phase transformer.

In addition, the first bridge arm of the second converter is electrically connected to the first inter-phase transformer unit of the first inter-phase transformer and the first inter-phase transformer unit of the third inter-phase transformer; the second bridge arm of the second converter is electrically connected to the second inter-phase transformer unit of the first inter-phase transformer and the second inter-phase transformer unit of the third inter-phase transformer; and the third bridge arm of the second converter is electrically connected to the third inter-phase transformer unit of the first inter-phase transformer and the third inter-phase transformer unit of the third inter-phase transformer.

Moreover, the first bridge arm of the third converter is electrically connected to the first inter-phase transformer unit of the second inter-phase transformer and the first inter-phase transformer unit of the third inter-phase transformer; the second bridge arm of the third converter is electrically connected to the second inter-phase transformer unit of the second inter-phase transformer and the second inter-phase transformer unit of the third inter-phase transformer; and the third bridge arm of the third converter is electrically connected to the third inter-phase transformer unit of the second inter-phase transformer and the third inter-phase transformer unit of the third inter-phase transformer.

In another embodiment of the present invention, the first, second and third bridge arms of the output sides of the first, second and third converters comprise a first wire, a second wire and a third wire respectively. With respect to the structure, the first wire of the first converter is winded on the upper half of the first inter-phase transformer unit of the first inter-phase transformer and the upper half of the first inter-phase transformer unit of the second inter-phase transformer in a winded direction; the second wire of the first converter is winded on the upper half of the second inter-phase transformer unit of the first inter-phase transformer and the upper half of the second inter-phase transformer unit of the second inter-phase transformer in a winded direction; and the third wire of the first converter is winded on the upper half of the third inter-phase transformer unit of the first inter-phase transformer and the upper half of the third inter-phase transformer unit of the second inter-phase transformer in a winded direction.

In addition, the first wire of the second converter is winded on the lower half of the first inter-phase transformer unit of the first inter-phase transformer and the upper half of the first inter-phase transformer unit of the third inter-phase transformer in a winded direction; the second wire of the second converter is winded on the lower half of the second inter-phase transformer unit of the first inter-phase transformer and the upper half of the second inter-phase transformer unit of the third inter-phase transformer in a winded direction; and the third wire of the second converter is winded on the lower half of the third inter-phase transformer unit of the first inter-phase transformer and the upper half of the third inter-phase transformer unit of the third inter-phase transformer in a winded direction.

Moreover, the first wire of the third converter is winded on the lower half of the first inter-phase transformer unit of the second inter-phase transformer in a winded direction and is winded on the lower half of the first inter-phase transformer unit of the third inter-phase transformer in a winded direction; the second wire of the third converter is winded on the lower half of the second inter-phase transformer unit of the second inter-phase transformer in a winded direction and is winded on the lower half of the second inter-phase transformer unit of the third inter-phase transformer in a winded direction; and the third wire of the third converter is winded on the lower half of the third inter-phase transformer unit of the second inter-phase transformer in a winded direction and is winded on the lower half of the third inter-phase transformer unit of the third inter-phase transformer in a winded direction.

In yet another embodiment of the present invention, the first inter-phase transformer, the second inter-phase transformer, the third inter-phase transformer or the integrated inter-phase transformer is a three-phase N-limb cores transformer, wherein N is an integer being greater than two.

In another aspect of the embodiment of the present invention, a converter system is provided. The converter system comprises a first converter, a second converter, and a first inter-phase transformer. Furthermore, the first and second converters comprise a first side and a second side. The first side of the first converter comprises a first bridge arm, a second bridge arm and a third bridge arm. The first side of the second converter comprises a first bridge arm, a second bridge arm and a third bridge arm. The first inter-phase transformer comprises a first inter-phase transformer unit, a second inter-phase transformer unit and a third inter-phase transformer unit.

With respect to the structure, the second side of the second converter is electrically connected to the second side of the first converter. The first inter-phase transformer unit is electrically connected between the first bridge arm of the first converter and the first bridge arm of the second converter; the second inter-phase transformer unit is electrically connected between the second bridge arm of the first converter and the second bridge arm of the second converter; and the third inter-phase transformer unit is electrically connected between the third bridge arm of the first converter and the third bridge arm of the second converter.

In one embodiment of the present invention, the converter system further comprises a third converter, and a second inter-phase transformer. Furthermore, the third converter comprises a first side and a second side. The second inter-phase transformer comprises a first inter-phase transformer unit, a second inter-phase transformer unit and a third inter-phase transformer unit. The first side of the third converter comprises a first bridge arm, a second bridge arm and a third bridge arm. The first, second and third inter-phase transformer units of the first inter-phase transformer comprise an output terminal respectively.

With respect to the structure, the second side of the third converter is electrically connected to the second sides of the first, second converters. The first, second and third inter-phase transformer units of the first inter-phase transformer comprise an output terminal respectively, wherein the first inter-phase transformer unit of the second inter-phase transformer is electrically connected between the output terminal of the first inter-phase transformer unit of the first inter-phase transformer and the first bridge arm of the third converter; the second inter-phase transformer unit of the second inter-phase transformer is electrically connected between the output terminal of the second inter-phase transformer unit of the first inter-phase transformer and the second bridge arm of the third converter; and the third inter-phase transformer unit of the second inter-phase transformer is electrically connected between the output terminal of the third inter-phase transformer unit of the first inter-phase transformer and the third bridge arm of the third converter.

In another embodiment of the present invention, the converter system further comprises a third converter, a fourth converter, a second inter-phase transformer, and an integrated inter-phase transformer. Furthermore, the third converter comprises a first side and a second side. The fourth converter comprises a first side and a second side. The second inter-phase transformer comprises a first inter-phase transformer unit, a second inter-phase transformer unit and a third inter-phase transformer unit. The integrated inter-phase transformer comprises a first inter-phase transformer unit, a second inter-phase transformer unit and a third inter-phase transformer unit. The first side of the third converter comprises a first bridge arm, a second bridge arm and a third bridge arm. The first side of the fourth converter comprises a first bridge arm, a second bridge arm and a third bridge arm. The first, second and third inter-phase transformer units of the first inter-phase transformer comprise an output terminal respectively, and the first, second and third inter-phase transformer units of the second inter-phase transformer comprise an output terminal respectively.

With respect to the structure, the second side of the fourth converter is electrically connected to the second side of the third converter. The first inter-phase transformer unit of the second inter-phase transformer is electrically connected between the first bridge arm of the third converter and the first bridge arm of the fourth converter; the second inter-phase transformer unit of the second inter-phase transformer is electrically connected between the second bridge arm of the third converter and the second bridge arm of the fourth converter; and the third inter-phase transformer unit of the second inter-phase transformer is electrically connected between the third bridge arm of the third converter and the third bridge arm of the fourth converter. The first inter-phase transformer unit of the integrated inter-phase transformer is electrically connected between the output terminal of the first inter-phase transformer unit of the first inter-phase transformer and the output terminal of the first inter-phase transformer unit of the second inter-phase transformer; the second inter-phase transformer unit of the integrated inter-phase transformer is electrically connected between the output terminal of the second inter-phase transformer unit of the first inter-phase transformer and the output terminal of the second inter-phase transformer unit of the second inter-phase transformer; and the third inter-phase transformer unit of the integrated inter-phase transformer is electrically connected between the output terminal of the third inter-phase transformer unit of the first inter-phase transformer and the output terminal of the third inter-phase transformer unit of the second inter-phase transformer.

In yet another embodiment of the present invention, the converter system further comprises a third converter, a second inter-phase transformer, and a third inter-phase transformer. Furthermore, the third converter comprises a first side and a second side. The second inter-phase transformer comprises a first inter-phase transformer unit, a second inter-phase transformer unit and a third inter-phase transformer unit. The third inter-phase transformer comprises a first inter-phase transformer unit, a second inter-phase transformer unit and a third inter-phase transformer unit. The first side of the third converter comprises a first bridge arm, a second bridge arm and a third bridge arm.

With respect to the structure, the first inter-phase transformer unit of the second inter-phase transformer is electrically connected between the first bridge arm of the first converter and the first bridge arm of the third converter; the second inter-phase transformer unit of the second inter-phase transformer is electrically connected between the second bridge arm of the first converter and the second bridge arm of the third converter; and the third inter-phase transformer unit of the second inter-phase transformer is electrically connected between the third bridge arm of the third bridge arm and the third converter of the first converter.

In addition, the first inter-phase transformer unit of the third inter-phase transformer is electrically connected between the first bridge arm of the second converter and the first bridge arm of the third converter. The second inter-phase transformer unit of the third inter-phase transformer is electrically connected between the second bridge arm of the second converter and the second bridge arm of the third converter. The third inter-phase transformer unit of the third inter-phase transformer is electrically connected between the third bridge arm of the second converter and the third bridge arm of the third converter.

In still another embodiment of the present invention, the first inter-phase transformer, the second inter-phase transformer, the third inter-phase transformer or the integrated inter-phase transformer is a three-phase N-limb cores transformer, wherein N is an integer being greater than two.

As a result, the embodiments of the present invention provide a converter system for limiting a circulating current that is generated by connecting converters of the converter system in parallel while the efficiency of the converter system is maintained in a steady state.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
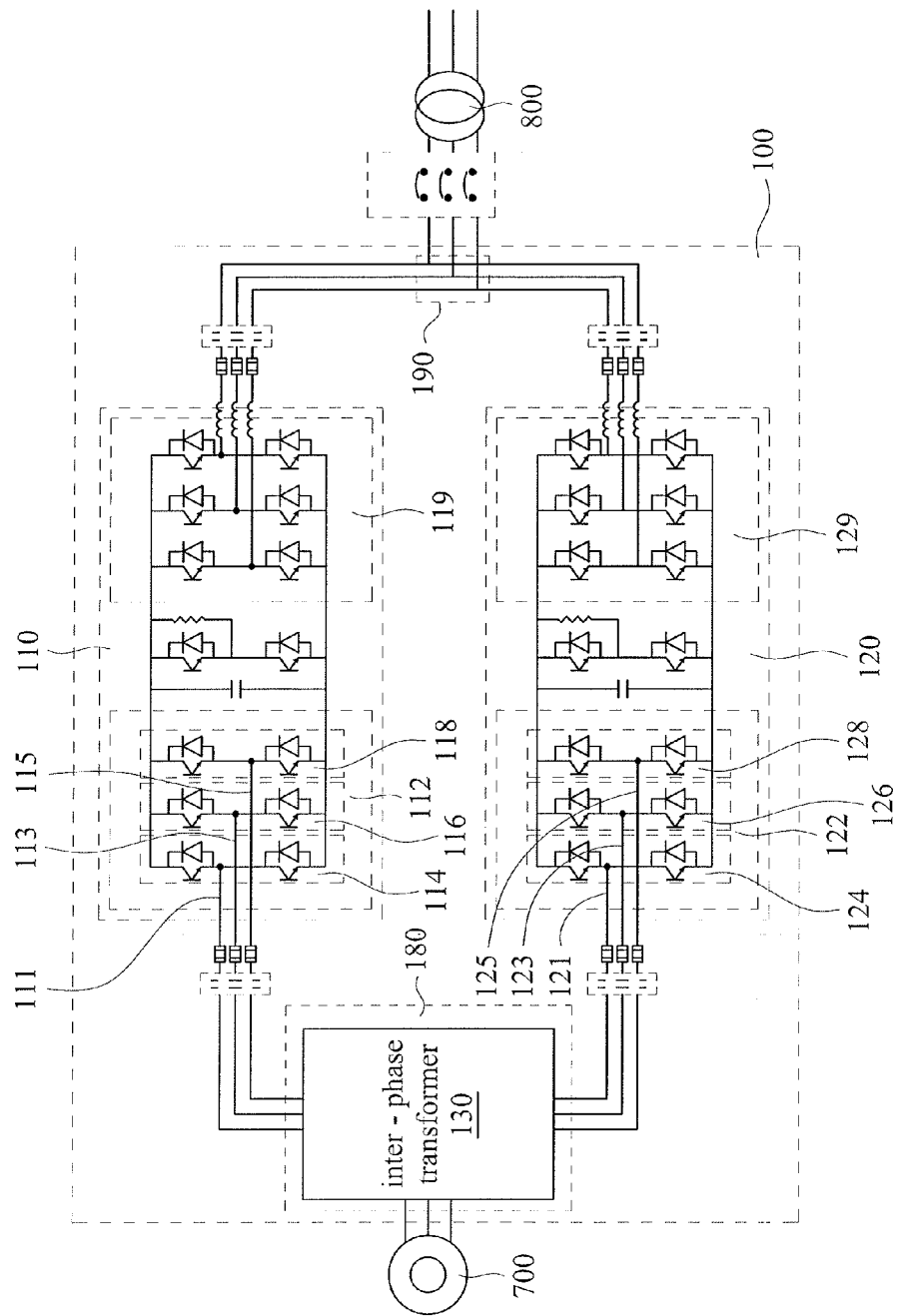
FIG. 1A schematically shows a block diagram of a converter system according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1A schematically shows a block diagram of a converter system 100 according to embodiments of the present invention. The converter system 100 comprises a first converter 110, a second converter 120, and a first inter-phase transformer 130.

With respect to the structure, the first converter 110 and the second converter 120 are electrically connected in parallel across a first input side parallel terminal 180 (for example, at a generator side parallel terminal; the generator side parallel terminal is adjacent to a generator 700) and a first output side parallel terminal 190 (for example, at the grid side parallel terminal; the grid side parallel terminal is adjacent to a grid 800). The first inter-phase transformer 130 is disposed at the first input side parallel terminal 180 for limiting a circulating current generated by the first converter 110 and the second converter 120.

It is noted that the converter system 100 of the embodiment of the present invention can be employed in a wind energy generating system. In one embodiment, the converter system 100 of the embodiment of the present invention can be employed in a direct drive wind energy generating system. The direct drive wind energy generating system needs a high power converter, but the anti-current characteristics of the converter these days can not satisfy the requirement of the direct drive wind energy generating system. Connecting converters in parallel is a way to satisfy the requirement of the direct drive wind energy generating system. Therefore, the first converter and the second converter can employ a parallel structure; furthermore, the parallel structure can be a parallel back to back converter structure. However, the scope of the present invention is not intended to be limited in this regard, those skilled in the art can selectively apply the converter system 100 in a suitable system based on the actual requirement.

Figure 1B:
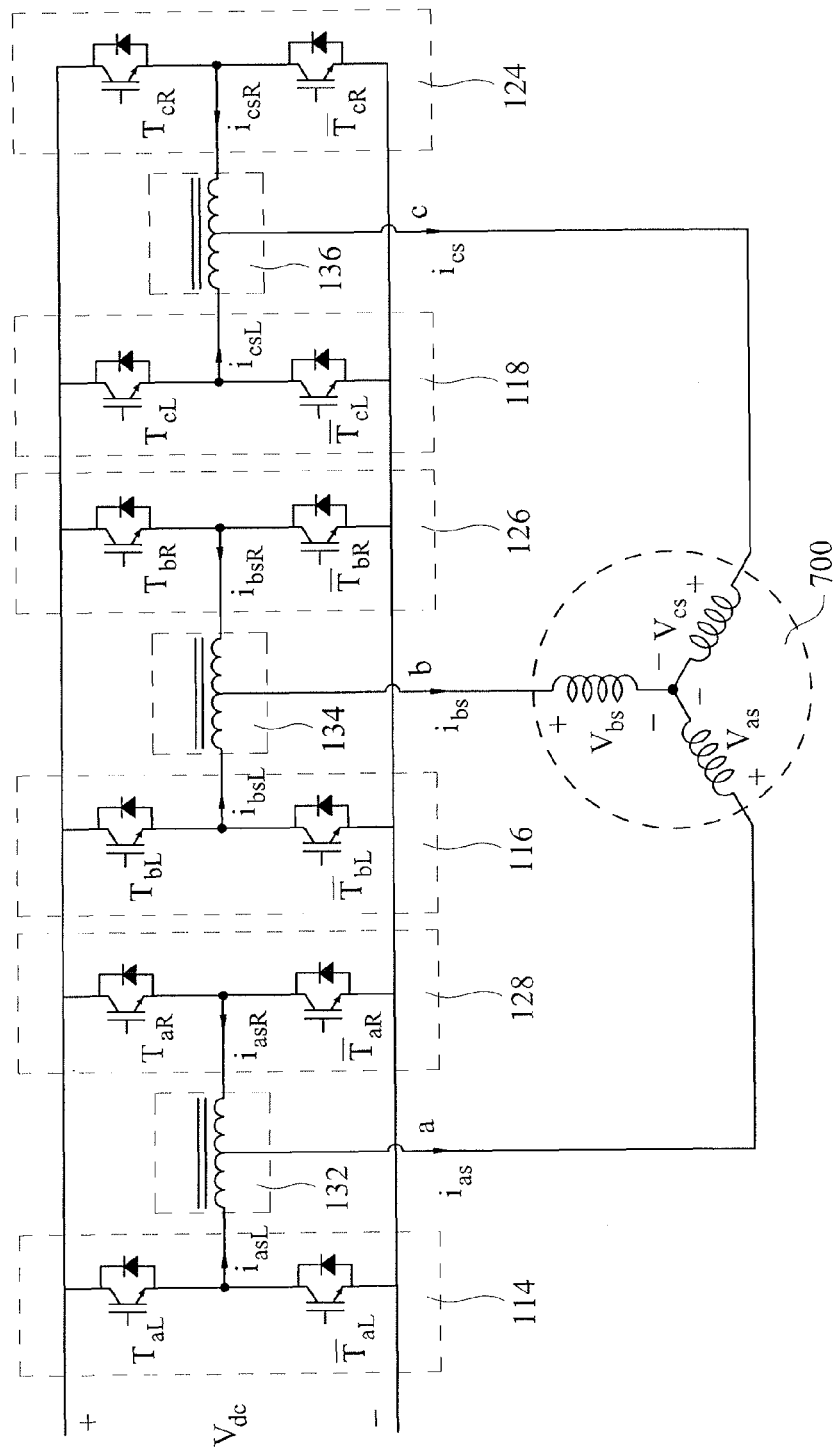
FIG. 1B schematically shows a portion of a block diagram of the converter system according to FIG. 1A of the present invention.

FIG. 1B schematically shows a portion of a block diagram of the converter system 100 according to FIG. 1A of the present invention. As shown in FIG. 1B, the first converter 110 comprises an input side 112 and an output side 119. The input side 112 of the first converter 110 comprises a bridge arm 114, a bridge arm 116, and a bridge arm 118. Furthermore, the second converter 120 comprises an input side 122 and an output side 129. The input side 122 of the second converter 120 comprises a bridge arm 124, a bridge arm 126 and a bridge arm 128. Moreover, the first inter-phase transformer 130 comprises a first inter-phase transformer unit 132, a second inter-phase transformer unit 134, and a third inter-phase transformer unit 136. With respect to the structure, the output side 119 of the first converter 110 is electrically connected to the output side 129 of the second converter 120.

For example, the first inter-phase transformer unit 132 of the first inter-phase transformer 130 is electrically connected between the bridge arm 114 of the first converter 110 and the bridge arm 128 of the second converter 120. When the current flowing into the first inter-phase transformer unit 132 through the bridge arm 114 is equal to the current flowing into the first inter-phase transformer unit 132 through the bridge arm 128, magnetic fields generated by above-mentioned currents can be neutralized. In addition, when the current flowing into the first inter-phase transformer unit 132 through the bridge arm 114 is equal to the current flowing into the first inter-phase transformer unit 132 through the bridge arm 128, above-mentioned currents can be restrained by inductance generated by the first inter-phase transformer unit 132.

In addition, the second inter-phase transformer unit 134 of the first inter-phase transformer 130 is electrically connected between the bridge arm 116 of the first converter 110 and the bridge arm 126 of the second converter 120. The third inter-phase transformer unit 136 of the first inter-phase transformer 130 is electrically connected between the bridge arm 118 of the first converter 110 and the bridge arm 124 of the second converter 120. The operation of the second and third inter-phase transformer units 134, 136 are the same as the first inter-phase transformer unit 132, and a detailed description regarding the operation is omitted herein. In sum, the forgoing operation can restrain a circulating current generated by connecting the first converter 110 and the second converter 120 of the converter system 100.

Figure 2:
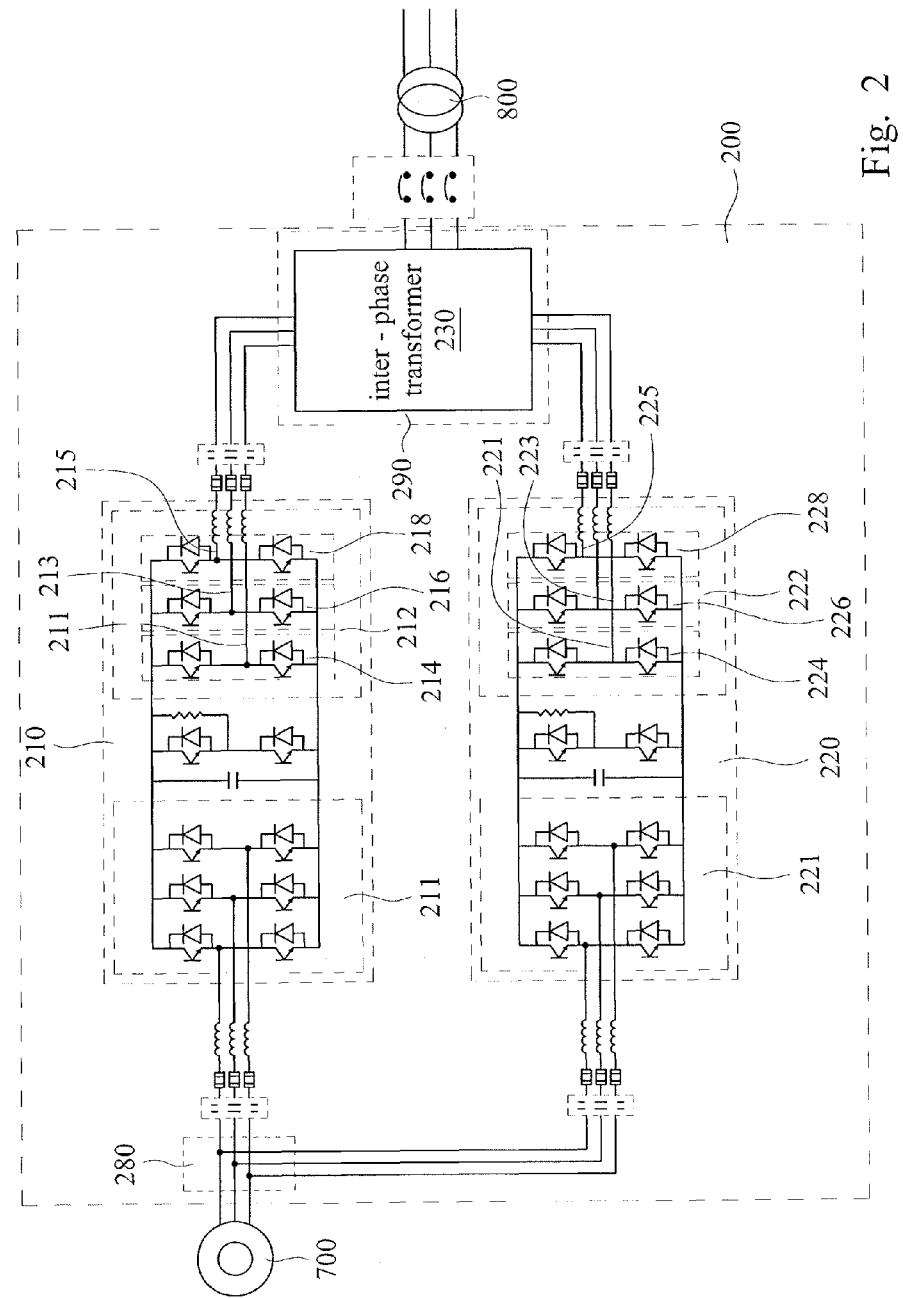
FIG. 2 schematically shows a block diagram of a converter system according to embodiments of the present invention.

FIG. 2 schematically shows a block diagram of a converter system according to embodiments of the present invention. The converter system 200 comprises a first converter 210, a second converter 220, and a first inter-phase transformer 230.

With respect to the structure, the first converter 210 and the second converter 220 are electrically connected in parallel between a first input side parallel terminal 280 (for example, at the generator side parallel terminal; the generator side parallel terminal is adjacent to a generator 700) and a first output side parallel terminal 290 (for example, at the grid side parallel terminal; the grid side parallel terminal is adjacent to a grid 800). The first inter-phase transformer 230 is disposed at the first output side parallel terminal 290 for limiting a circulating current generated by the first converter 210 and the second converter 220.

In addition, the first converter 210 can comprise an input side 211 and an output side 212, the second converter 220 can also comprise an input side 221 and an output side 222, and the inter-phase transformer 230 can also comprise three inter-phase transformer units. Each of the inter-phase transformer units is electrically connected between the bridge arm of the output side 212 of the first converter 210 and the corresponding bridge arm of the output side 222 of the second converter 220, and the connection relation and operation are similar to the description of FIG. 1B.

Reference is now made to both FIG. 1A and FIG. 2. The above structures respectively depict different embodiments when the inter-phase transformer of the converter system is at the generator side parallel terminal and the grid side parallel terminal. The above-mentioned embodiments of the present invention can achieve the goal of limiting a circulating current generated by connecting the first converter and the second converter of the converter system.

Figure 3A:
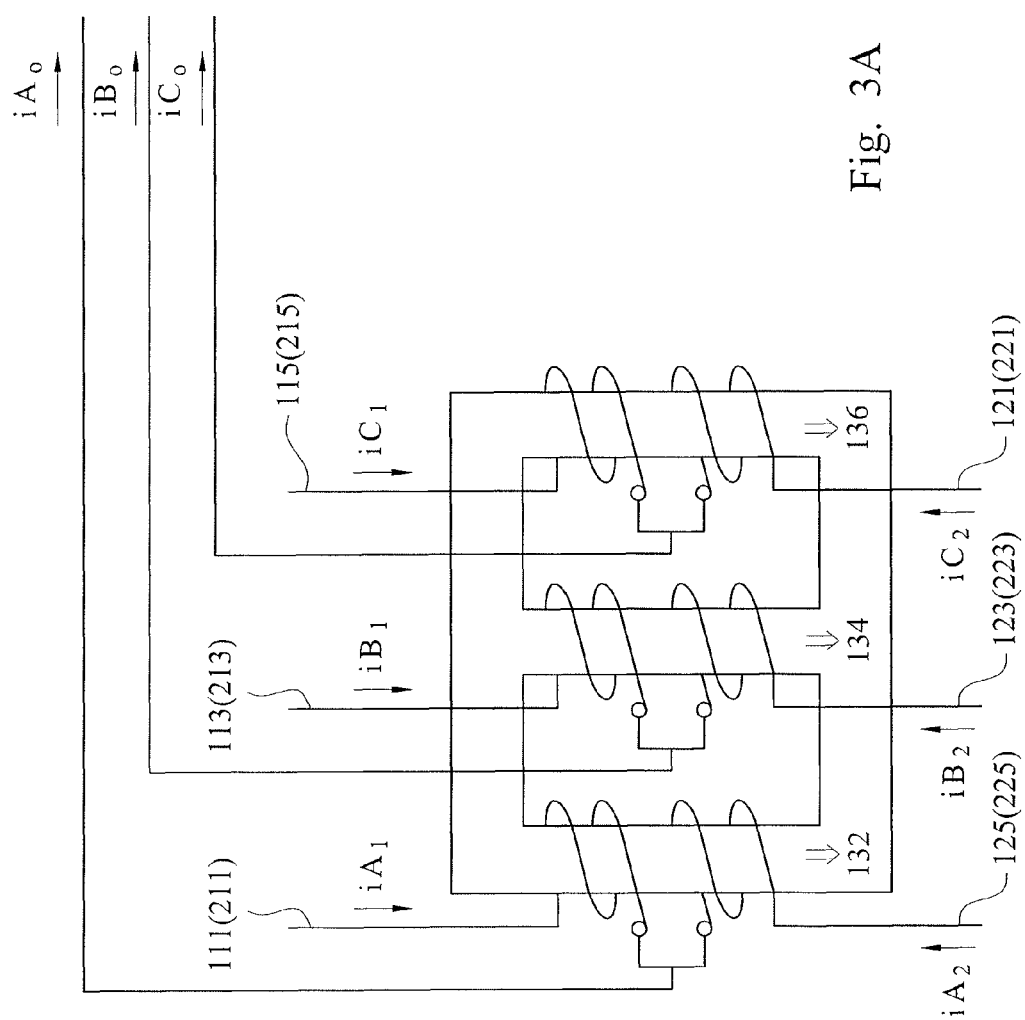
FIG. 3A schematically shows a block diagram of an inter-phase transformer according to embodiments of the present invention.
Figure 3B:
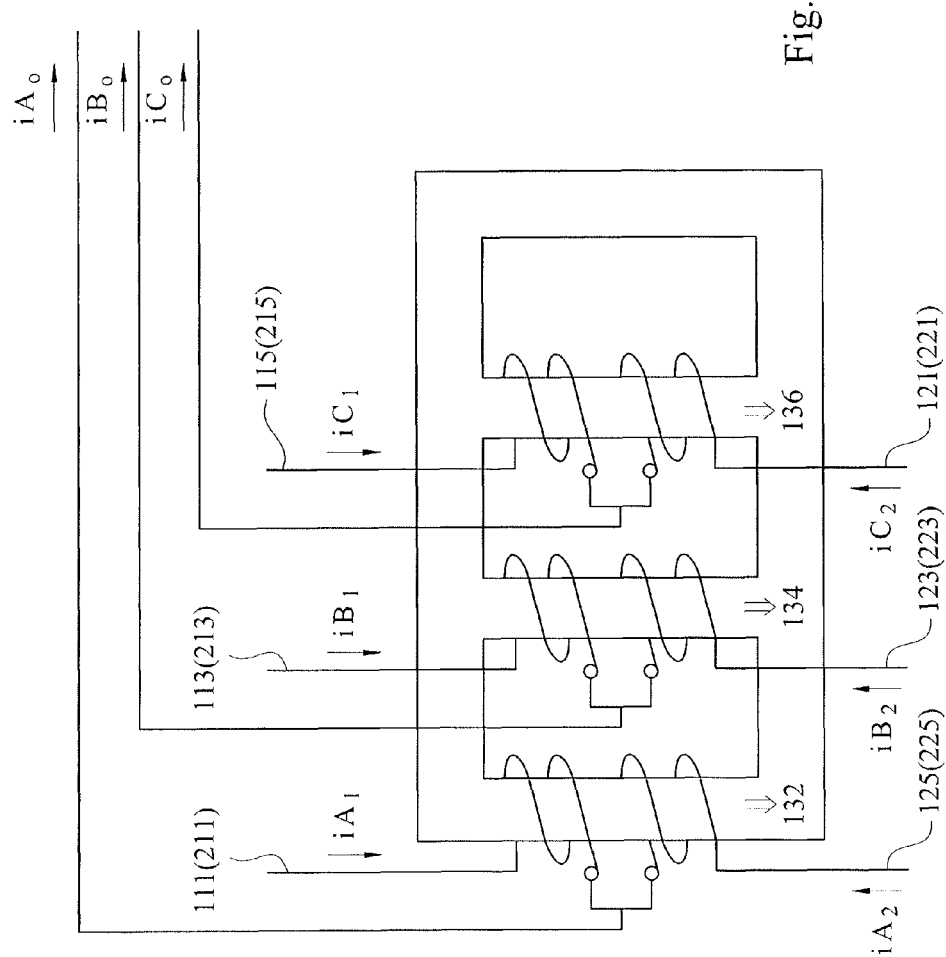
FIG. 3B schematically shows a block diagram of an inter-phase transformer according to embodiments of the present invention.

Through the whole specification, the inter-phase transformer which the converter system of the embodiment of the present invention employed is a three-phase N-limb cores transformer, wherein N is an integer being greater than two. The structure of the inter-phase transformer is as shown in FIGS. 3A and 3B, wherein FIG. 3A and FIG. 3B schematically show a block diagram of an inter-phase transformer according to embodiments of the present invention respectively. As shown in FIG. 3A, the inter-phase transformer can be a three-phase three-limb cores inter-phase transformer, and the inter-phase transformer as shown in FIG. 3B is a three-phase four-limb cores inter-phase transformer.

With respect to the operation, the three-phase three-limb cores inter-phase transformer which the converter system of the embodiment of the present invention employed can restrain the circulating current. Furthermore, when the converter system of the embodiment of the present invention employs a three-phase four-limb cores inter-phase transformer, the effect of limiting the circulating current is better than employing a three-phase three-limb cores inter-phase transformer. However, the scope of the embodiment of the present invention is not intended to be limited in this regard, and those skilled in the art can selectively employ a proper type of inter-phase transformer according to actual requirements.

With respect to the above-mentioned description, the description of FIG. 3A recites a three-phase three-limb inter-phase transformer, and the description of FIG. 3B recites a three-phase four-limb inter-phase transformer. The structures of the two is similar to each other, for the sake of brevity, the embodiment of the present invention as illustrated below employs the three-phase four-limb inter-phase transformer as shown in FIG. 3B to illustrate the structure of the converter system 100.

Reference is now made to FIGS. 1A, 1B and 3B, the bridge arm 114 of the input side 112 of the first converter 110 is electrically connected to the first inter-phase transformer unit 132 of the first inter-phase transformer, the bridge arm 116 of the input side 112 of the first converter 110 is electrically connected to the second inter-phase transformer unit 134 of the first inter-phase transformer, and the bridge arm 118 of the input side 112 of the first converter 110 is electrically connected to the third inter-phase transformer unit 136 of the first inter-phase transformer.

In addition, the bridge arm 124 of the input side 122 of the second converter 120 is electrically connected to the third inter-phase transformer unit 136, the bridge arm 126 of the input side 122 of the second converter 120 is electrically connected to the second inter-phase transformer unit 134, and the bridge arm 128 of the input side 122 of the second converter 120 is electrically connected to the first inter-phase transformer unit 132.

In detailed, in the input side 112 of the first converter 110, the bridge arm 114 comprises a wire 111, the bridge arm 116 comprises a wire 113, and the bridge arm 118 comprises a wire 115. In the input side 122 of the second converter 120, the bridge arm 124 comprises a wire 121, the bridge arm 126 comprises a wire 123, and the bridge arm 128 comprises a wire 125.

With respect to the structure, the wire 111 of the input side 112 of the first converter 110 is winded on the upper half of the first inter-phase transformer unit 132 in a winded direction, the wire 113 of the input side 112 of the first converter 110 is winded on the upper half of the second inter-phase transformer unit 134 in a winded direction, and the wire 115 of the input side 112 of the first converter 110 is winded on the upper half of the third inter-phase transformer unit 136 in a winded direction.

The wire 121 of the input side 122 of the second converter 120 is winded on the lower half of the third inter-phase transformer unit 136 in a winded direction, the wire 123 of the input side 122 of the second converter 120 is winded on the lower half of the second inter-phase transformer unit 134 in a winded direction, and the wire 125 of the input side 122 of the second converter 120 is winded on the lower half of the first inter-phase transformer unit 132 in a winded direction.

In another embodiment of the present invention, reference is now made to FIGS. 2 and 3. The bridge arm 214 of the output side 212 of the first converter 210 is electrically connected to the first inter-phase transformer unit 132 of the first inter-phase transformer, the bridge arm 216 of the output side 212 of the first converter 210 is electrically connected to the second inter-phase transformer unit 134 of the first inter-phase transformer, and the bridge arm 218 of the output side 212 of the first converter 210 is electrically connected to the third inter-phase transformer unit 136 of the first inter-phase transformer.

In addition, the bridge arm 224 of the output side 222 of the second converter 220 is electrically connected to the third inter-phase transformer unit 136, the bridge arm 226 of the output side 222 of the second converter 220 is electrically connected to the second inter-phase transformer unit 134, and the bridge arm 228 of the output side 222 of the second converter 220 is electrically connected to the first inter-phase transformer unit 132.

In detailed, in the output side 212 of the first converter 210, the bridge arm 214 comprises a wire 211, the bridge arm 216 comprises a wire 213, and the bridge arm 218 comprises a wire 215. In the output side 222 of the second converter 220, the bridge arm 224 comprises a wire 221, the bridge arm 226 comprises a wire 223, and the bridge arm 228 comprises a wire 225.

With respect to the structure, the wire 211 of the output side 212 of the first converter 210 is winded on the upper half of the first inter-phase transformer unit 132 in a winded direction, the wire 213 of the output side 212 of the first converter 210 is winded on the upper half of the second inter-phase transformer unit 134 in a winded direction, and the wire 215 of the output side 212 of the first converter 210 is winded on the upper half of the third inter-phase transformer unit 136 in a winded direction.

The wire 221 of the output side 222 of the second converter 220 is winded on the lower half of the third inter-phase transformer unit 136 in a winded direction, the wire 223 of the output side 222 of the second converter 220 is winded on the lower half of the second inter-phase transformer unit 134 in a winded direction, and the wire 225 of the input side 222 of the second converter 220 is winded on the lower half of the first inter-phase transformer unit 132 in a winded direction.

Figure 4:
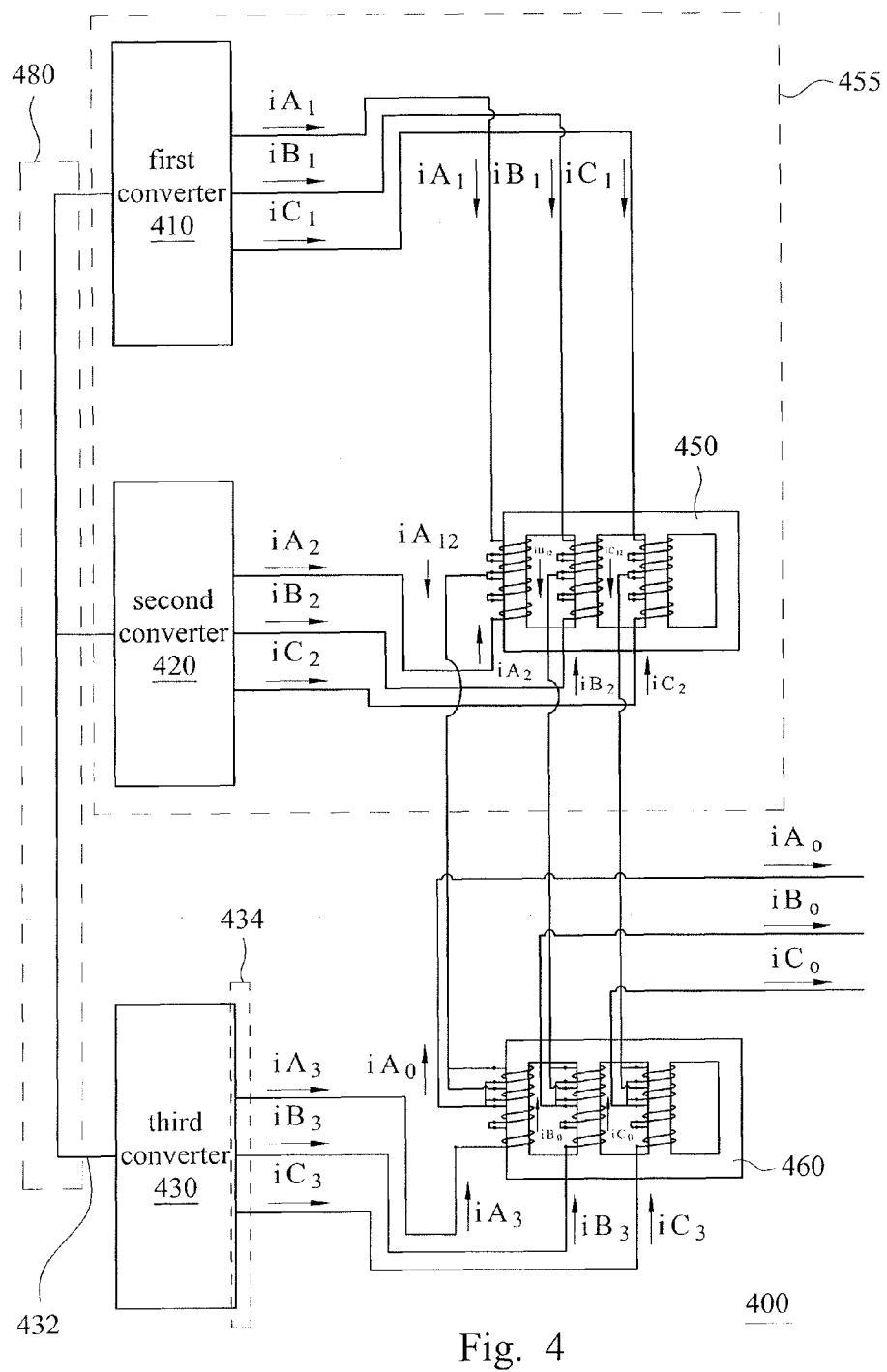
FIG. 4 schematically shows a block diagram of a converter system according to embodiments of the present invention.

FIG. 4 schematically shows a block diagram of a converter system 400 according to embodiments of the present invention. Reference is now made to FIGS. 2 and 4. Compared with the converter system 200 of FIG. 2, beside the first converter 410, the second converter 420, and the first inter-phase transformer 450, the converter system 400 herein further comprises a third converter 430 and a second inter-phase transformer 460. Furthermore, the third converter 430 comprises an input side 432 and an output side 434.

With respect to the structure, the first converter 410 and the second converter 420 can be regard as electrically connected in parallel into a first converter parallel device 455, and the third converter 430 is electrically connected to the first converter parallel device 455 in parallel. In detailed, the input side 432 of the third converter 430 is electrically connected to the first input side parallel terminal 480, and the second inter-phase transformer 460 is electrically connected between the output side 434 of the third converter 430 and the first inter-phase transformer 450.

As a result, when there is a need to connect more converters in parallel to satisfy the requirement of the high-power wind energy generator, the structure of the converter system 400 as shown in FIG. 4 can be employed so as to connect the third converter 430 with the original first and second converters 410, 420 in parallel for limiting a circulating current generated by the parallel structure of the first converter parallel device 455 and the third converter 430 by the used of the second inter-phase transformer 460 such that the converter system 400 of the embodiment of the present invention can restrain a circulating current when there is a need to connect more converters in parallel to prevent the converter system 400 from damage.

As mentioned above, compared with FIG. 2, the converter system 400 as illustrated in FIG. 4 exemplarily recites the condition that the third converter being connected to the converter system in parallel when the first inter-phase transformer is disposed at the grid side parallel terminal. In addition, referring to FIG. 1A, when the first inter-phase transformer is disposed at the generator side parallel terminal (for example, the first input side parallel terminal 180), the structure of connecting the third converter to the converter system in parallel is similar to the structure of the converter system 400 as illustrated in FIG. 4, and a detailed description regarding to the structure is omitted herein for the sake of brevity.

As a result, when the first inter-phase transformer is disposed at the generator side parallel terminal, one side of the third converter is electrically connected to the grid side parallel terminal, and the second inter-phase transformer is electrically connected between another side of the third converter and the first inter-phase transformer. When the first inter-phase transformer is disposed at the grid side parallel terminal, one side of the third converter is electrically connected to the generator side parallel terminal, and the second inter-phase transformer is electrically connected between another side of the third converter and the first inter-phase transformer.

In short, no matter the first inter-phase transformer is disposed at the generator side parallel terminal or the grid side parallel terminal, the third converter and the second inter-phase transformer can be disposed correspondingly such that the converter system of the embodiment of the present invention can restrain a circulating current when there is a need to connect more converters in parallel to prevent the converter system from damage.

In an optional embodiment of the present invention, reference is now made to FIG. 1B to further introduce the disposition of the converter system 400 in FIG. 4. The first, second and third converters all comprise a first side and a second side. For example, one of the first side and second side can be the input side or the output side, and the first side and second side comprise a first bridge arm, a second bridge arm, and a third bridge arm respectively. The first and second inter-phase transformers comprise a first inter-phase transformer unit, a second inter-phase transformer unit, and a third inter-phase transformer unit respectively, and the first, second and third inter-phase transformer units of the first inter-phase transformer comprise an output terminal respectively.

With respect to the structure, the second side of the third converter is electrically connected to the second side of the first and second converters. The first inter-phase transformer unit of the second inter-phase transformer is electrically connected between the output terminal of the first inter-phase transformer unit of the first inter-phase transformer and the first bridge arm of the third converter, the second inter-phase transformer unit of the second inter-phase transformer is electrically connected between the output terminal of the second inter-phase transformer unit of the first inter-phase transformer and the second bridge arm of the third converter, and the third inter-phase transformer unit of the second inter-phase transformer is electrically connected between the output terminal of the third inter-phase transformer unit of the first inter-phase transformer and the third bridge arm of the third converter.

As the disposition mentioned above, in the condition of connecting the third converter with the converter system in parallel, the second inter-phase transformer can be further used to restrain a circulating current generated by a parallel composed of the first and the second converter and the third converter herein due to the circulating current of the first and the second converter is restrained.

Figure 5:
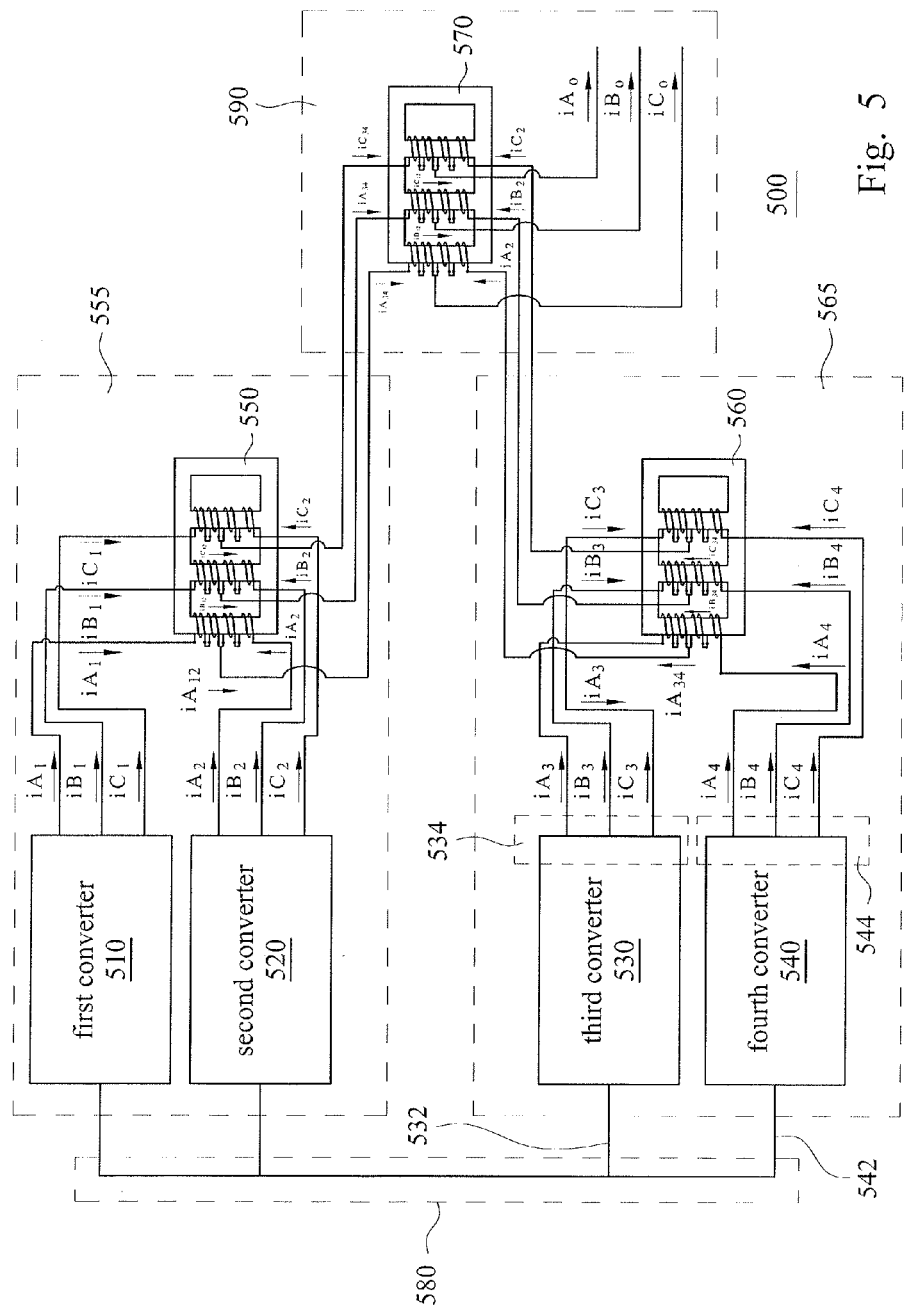
FIG. 5 schematically shows a block diagram of a converter system according to embodiments of the present invention.

FIG. 5 schematically shows a block diagram of a converter system 500 according to embodiments of the present invention. Reference is now made to FIGS. 2 and 5. Compared with the converter system 200 of FIG. 2, beside the first converter 510, the second converter 520, and the first inter-phase transformer 550, the converter system 500 herein further comprises a third converter 530, a fourth converter 540, a second inter-phase transformer 560, and an integrated inter-phase transformer 570.

With respect to the structure, the first converter 510 and the second converter 520 can be regard as electrically connected in parallel into a first converter parallel device 555, and the third converter 530 and fourth converter 540 can be regard as electrically connected in parallel into a second converter parallel device 565. Subsequently, the first converter parallel device 555 is electrically connected to the second converter parallel device 565 in parallel.

For example, one terminal of the first converter parallel device 555 and one terminal of the second converter parallel device 565 are electrically connected to the generator side parallel terminal 580, and another terminal of the first converter parallel device 555 and another terminal of second converter parallel device 565 are electrically connected to the grid side parallel terminal 590. The integrated inter-phase transformer 570 is disposed at the grid side parallel terminal 590 for limiting a circulating current generated by the first converter parallel device 555 and the second converter parallel device 565.

As a result, when there is a need to connect more converters in parallel to satisfy the requirement of the high-power wind energy generator, the structure of the converter system 500 as shown in FIG. 5 can be employed so as to connect the third and fourth converters 530, 540 with the original first and second converters 510, 520 in parallel for limiting a circulating current generated by the parallel structure of the first converter parallel device 555 and the second converter parallel device 565 by the used of the integrated inter-phase transformer 570 such that the converter system 500 of the embodiment of the present invention can restrain the circulating current when there is a need to connect more converters in parallel to prevent the converter system 500 from damage.

In detailed, in the second converter parallel device 565, the input side 532 of the third converter 530 and the input side 542 of the fourth converter 540 are electrically connected to the second input side parallel terminal, and the output side 534 of the third converter 530 and the output side 544 of the fourth converter 540 are electrically connected to the second output side parallel terminal. The second inter-phase transformer 560 is disposed at the second output side parallel terminal for limiting a circulating current generated by the third converter 530 and the fourth converter 540.

As mentioned above, compared with FIG. 2, the converter system 500 as illustrated in FIG. 5 exemplarily recites the condition that the third converter being connected to the converter system in parallel when the first inter-phase transformer is disposed at the grid side parallel terminal. In addition, referring to FIG. 1A, when the first inter-phase transformer is disposed at the generator side parallel terminal (for example: the first input side parallel terminal 180), the structure of connecting the third and fourth converters to the converter system in parallel is similar to the structure of the converter system 500 as illustrated in FIG. 5, and a detailed description regarding to the structure is omitted herein for the sake of brevity.

As a result, the integrated inter-phase transformer can be disposed at the generator side parallel terminal or the grid side parallel terminal to restrain a circulating current generated by the first converter parallel device and the second converter parallel device such that the converter system of the embodiment of the present invention can restrain the circulating current when there is a need to connect more converters in parallel to prevent the converter system from damage.

In an optional embodiment of the present invention, reference is now made to FIG. 1B to further introduce the disposition of the converter system 500 as shown in FIG. 5. The first, second, third and fourth converters comprise a first side and a second side respectively. For example, one of the first side and the second side can be an input side or an output side, and the first side and second side comprise a first bridge arm, a second bridge arm and a third bridge arm respectively. The first, second and integrated inter-phase transformers comprise a first inter-phase transformer unit, a second inter-phase transformer unit and a third inter-phase transformer unit respectively. The first, second and third inter-phase transformer units of the first and second inter-phase transformers comprise an output terminal respectively.

With respect to the structure, the second side of the fourth converter is electrically connected to the second side of the third converter. The first inter-phase transformer unit of the second inter-phase transformer is electrically connected between the first bridge arm of the third converter and the first bridge arm of the fourth converter, the second inter-phase transformer unit of the second inter-phase transformer is electrically connected between the second bridge arm of the third converter and the second bridge arm of the fourth converter, and the third inter-phase transformer unit of the second inter-phase transformer is electrically connected between the third bridge arm of the third converter and the third bridge arm of the fourth converter.

In addition, the first inter-phase transformer unit of the integrated inter-phase transformer is electrically connected between the output terminal of the first inter-phase transformer unit of the first inter-phase transformer and the output terminal of the first inter-phase transformer unit of the second inter-phase transformer, the second inter-phase transformer unit of the integrated inter-phase transformer is electrically connected between the output terminal of the second inter-phase transformer unit of the first inter-phase transformer and the output terminal of the second inter-phase transformer unit of the second inter-phase transformer, and the third inter-phase transformer unit of the integrated inter-phase transformer is electrically connected between the output terminal of the third inter-phase transformer unit of the first inter-phase transformer and the output terminal of the third inter-phase transformer unit of the second inter-phase transformer.

As the disposition mentioned above, when the third and fourth converters are connected to the converter system in parallel, the second inter-phase transformer is used to restrain a circulating current generated by the third converter and the fourth converter. When the circulating current generated by the first and the second converters and the circulating current generated by the third and fourth converters are all restrained; furthermore, the integrated inter-phase transformer can be used to restrain a circulating current generated by a parallel structure composed of the first and second converters and a parallel structure composed of the third and fourth converters.

Figure 6:
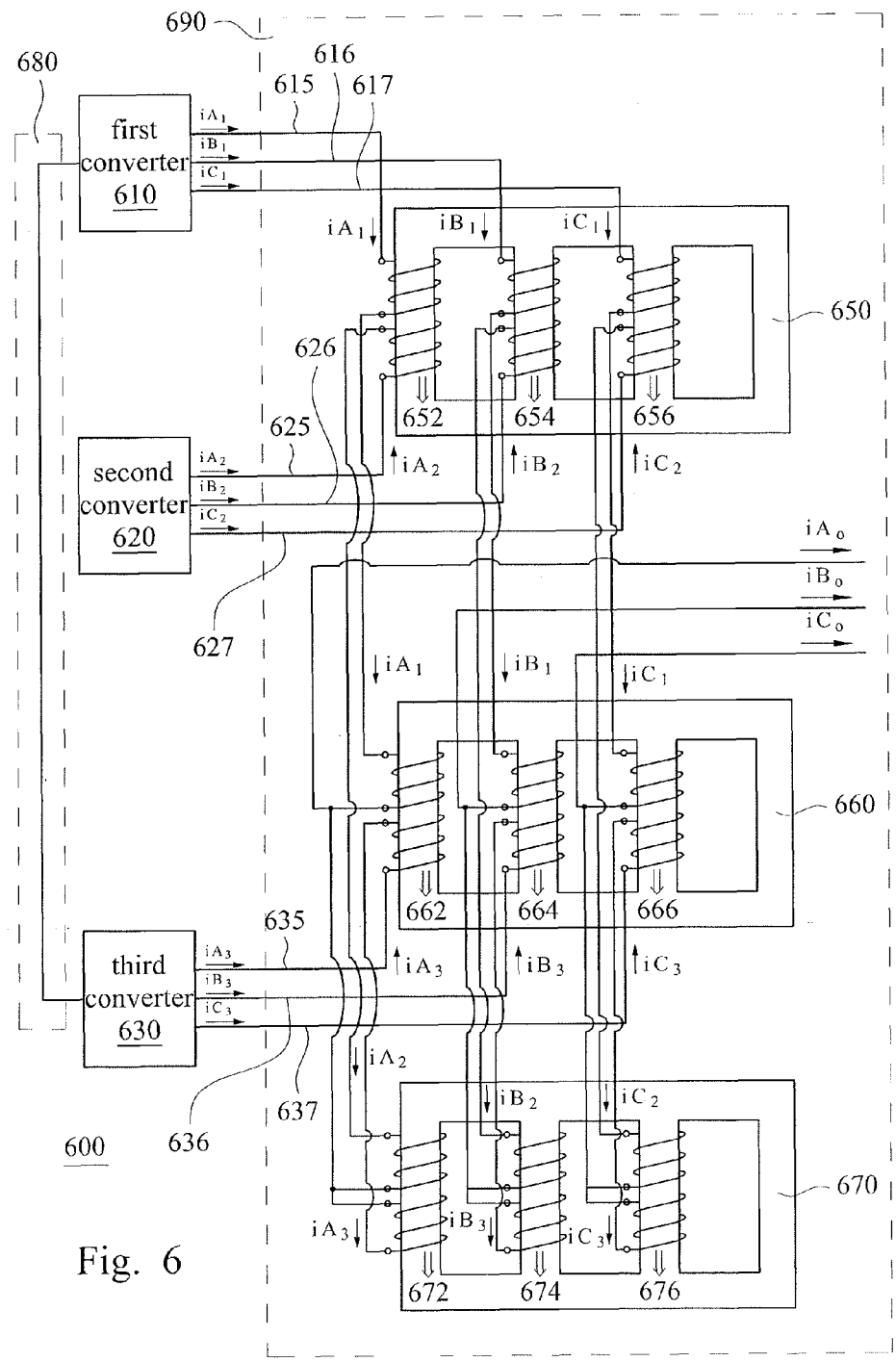
FIG. 6 schematically shows a block diagram of a converter system according to embodiments of the present invention.

FIG. 6 schematically shows a block diagram of a converter system 600 according to embodiments of the present invention. Reference is now made to FIGS. 2 and 6. Compared with the converter system 200 of FIG. 2, beside the first converter 610, the second converter 620, and the first inter-phase transformer 650, the converter system 600 herein further comprises a third converter 630, a second inter-phase transformer 660, and an third inter-phase transformer 670.

With respect to the structure, the third converter 630 is electrically connected to the first converter 610 and the second converter 620 in parallel between the first input side parallel terminal 680 and the first output side parallel terminal 690. As shown in the figure, the first, second and third inter-phase transformers 650, 660, 670 are disposed at the first output side parallel terminal 690. The first inter-phase transformer 650 is electrically connected between the first converter 610 and the second converter 620, the second inter-phase transformer 660 is electrically connected between the first converter 610 and the third converter 630, and the third inter-phase transformer 670 is electrically connected between the second converter 620 and the third converter 630. With respect to the operation, the first, second and third inter-phase transformers 650, 660, 670 are used to restrain a circulating current generated by each two of the first, second and third converters 610, 620, 630.

As mentioned above, compared with FIG. 2, the converter system 600 as illustrated in FIG. 6 exemplarily recites the condition that the third converter being connected to the converter system in parallel when the first inter-phase transformer is disposed at the grid side parallel terminal (for example, the first output side parallel terminal 690). In addition, referring to FIG. 1A, when the first inter-phase transformer is disposed at the generator side parallel terminal (for example, the first input side parallel terminal 180), the structure of connecting the third converter to the converter system in parallel is similar to the structure of the converter system 600 as illustrated in FIG. 6, and a detailed description regarding to the structure is omitted herein for the sake of brevity.

As a result, when the first inter-phase transformer is disposed at the generator side parallel terminal, the second and third inter-phase transformers are all disposed at the generator side parallel terminal, and the first, second and third inter-phase transformers are electrically connected to each two of the and first, second and third converters respectively. When the first inter-phase transformer is disposed at the grid side parallel terminal, the second and third inter-phase transformers are all disposed at the grid side parallel terminal, and the first, second and third inter-phase transformers are electrically connected to each two of the first, second and third converters respectively. With the use of the disposition of the circuit structure, the converter system of the embodiment of the present invention can restrain the circulating current when there is a need to connect more converters in parallel to prevent the converter system from damage.

Referring to FIG. 6, in detailed, the first, second and third converters 610, 620, 630, which is similar to the structure of FIG. 2, respectively comprise an input side and an output side. The input sides of the first, second and third converters 610, 620, 630 respectively comprise a first bridge arm, a second bridge arm and a third bridge arm. The first inter-phase transformer 650 comprises a first inter-phase transformer unit 652, a second inter-phase transformer unit 654, and a third inter-phase transformer unit 656, the second inter-phase transformer 660 comprises a first inter-phase transformer unit 662, a second inter-phase transformer unit 664, and a third inter-phase transformer unit 666, and the third inter-phase transformer 670 comprises a first inter-phase transformer unit 672, a second inter-phase transformer unit 674, and a third inter-phase transformer unit 676.

With respect to the structure, the electrical connection of each bridge arm of the converters and each inter-phase transformer units of the inter-phase transformer in the converter system 600 is similar to the electrical connection as shown in FIG. 1B. As such, the circuit structure as shown in FIG. 1B can be used to illustrate the circuit structure of the converter system 600. The first bridge arm of the first converter 610 is electrically connected to the first inter-phase transformer unit 652 of the first inter-phase transformer 650 and the first inter-phase transformer unit 662 of the second inter-phase transformer 660, the second bridge arm of the first converter 610 is electrically connected to the second inter-phase transformer unit 654 of the first inter-phase transformer 650 and the second inter-phase transformer unit 664 of the second inter-phase transformer 660, and the third bridge arm of the first converter 610 is electrically connected to the third inter-phase transformer unit 656 of the first inter-phase transformer 650 and the third inter-phase transformer unit 666 of the second inter-phase transformer 660.

In addition, the first bridge arm of the second converter 620 is electrically connected to the first inter-phase transformer unit 652 of the first inter-phase transformer 650 and the first inter-phase transformer unit 672 of the third inter-phase transformer 670, the second bridge arm of the second converter 620 is electrically connected to the second inter-phase transformer unit 654 of the first inter-phase transformer 650 and the second inter-phase transformer unit 674 of the third inter-phase transformer 670, and the third bridge arm of the second converter 620 is electrically connected to the third inter-phase transformer unit 656 of the first inter-phase transformer 650 and the third inter-phase transformer unit 676 of the third inter-phase transformer 670.

Moreover, the first bridge arm of the third converter 630 is electrically connected to the first inter-phase transformer unit 662 of the second inter-phase transformer 660 and the first inter-phase transformer unit 672 of the third inter-phase transformer 670, the second bridge arm of the third converter 630 is electrically connected to the second inter-phase transformer unit 664 of the second inter-phase transformer 660 and the second inter-phase transformer unit 674 of the third inter-phase transformer 670, and the third bridge arm of the third converter 630 is electrically connected to the third inter-phase transformer unit 666 of the second inter-phase transformer 660 and the third inter-phase transformer unit 676 of the third inter-phase transformer 670.

Furthermore, the first, second and third bridge arms of the input sides of the first, second and third converters 610, 620, 630 comprise the first wire, the second wire and the third wire respectively. As shown in FIG. 6, the first, second and third wires 615, 616, 617 are generated from the first, second and third bridge arms of the first converter 610 respectively. The first, second and third wires 625, 626, 627 are generated from the first, second and third bridge arms of the second converter 620 respectively. The first, second and third wires 635, 636, 637 are generated from the first, second and third bridge arms of the third converter 630 respectively.

With respect to the disposition, the first wire 615 of the first converter 610 is winded on the upper half of the first inter-phase transformer unit 652 of the first inter-phase transformer 650 and the upper half of the first inter-phase transformer unit 662 of the second inter-phase transformer 660 in a winded direction, the second wire 616 of the first converter 610 is winded on the upper half of the second inter-phase transformer unit 654 of the first inter-phase transformer 650 and the upper half of the second inter-phase transformer unit 664 of the second inter-phase transformer 660 in a winded direction, and the third wire 617 of the first converter 610 is winded on the upper half of the third inter-phase transformer unit 656 of the first inter-phase transformer 650 and the upper half of the third inter-phase transformer unit 666 of the second inter-phase transformer 660 in a winded direction.

In addition, the first wire 625 of the second converter 620 is winded on the lower half of the first inter-phase transformer unit 652 of the first inter-phase transformer 650 and the upper half of the first inter-phase transformer unit 672 of the third inter-phase transformer 670 in a winded direction, the second wire 626 of the second converter 620 is winded on the lower half of the second inter-phase transformer unit 654 of the first inter-phase transformer 650 and the upper half of the second inter-phase transformer unit 674 of the third inter-phase transformer 670 in a winded direction, and the third wire 627 of the second converter 620 is winded on the lower half of the third inter-phase transformer unit 656 of the first inter-phase transformer 650 and the upper half of the third inter-phase transformer unit 676 of the third inter-phase transformer 670 in a winded direction.

Moreover, the first wire 635 of the third converter 630 is winded on the lower half of the first inter-phase transformer unit 662 of the second inter-phase transformer 660 and the lower half of the first inter-phase transformer unit 672 of the third inter-phase transformer 670 in a winded direction, the second wire 636 of the third converter 630 is winded on the lower half of the second inter-phase transformer unit 664 of the second inter-phase transformer 660 and the lower half of the second inter-phase transformer unit 674 of the third inter-phase transformer 670 in a winded direction, and the third wire 637 of the third converter 630 is winded on the lower half of the third inter-phase transformer unit 666 of the second inter-phase transformer 660 and the lower half of the third inter-phase transformer unit 676 of the third inter-phase transformer 670 in a winded direction.

As shown above, the converter system 600 in FIG. 6 illustrates that the third converter is connected to the converter system in parallel when the first inter-phase transformer is disposed at the grid side parallel terminal (for example, the first output side parallel terminal 690). In addition, referring to FIG. 1A, when first inter-phase transformer is disposed at the generator side parallel terminal (for example, the first input side parallel terminal 180), the structure composed of the third converter being connected to the converter system in parallel is similar to the structure of the converter system 600 in FIG. 6, and a detailed description regarding to the structure is omitted herein.

As a result, when the first inter-phase transformer is disposed at the generator side parallel terminal, the second and third inter-phase transformers are all disposed at the generator side parallel terminal, and the first, second and third inter-phase transformers are electrically connected to each two of the and first, second and third converters respectively. When the first inter-phase transformer is disposed at the grid side parallel terminal, the second and third inter-phase transformers are all disposed at the grid side parallel terminal, and the first, second and third inter-phase transformers are electrically connected to each two of the first, second and third converters respectively. With the use of the disposition of the circuit structure, the converter system of the embodiment of the present invention can restrain the circulating current when there is a need to connect more converters in parallel to prevent the converter system from damage.

It is noted that the winded direction can be a clockwise direction or a counterclockwise direction, and the direction can be chose based on the actual requirements.

In the first inter-phase transformer 650 of the embodiment of the present invention, the wires 615, 616, 617 of the first converter 610 are winded on the corresponding upper half of inter-phase transformer units 652, 654, 656 of the first inter-phase transformer 650, and the wires 625, 626, 627 of the second converter 620 is winded on the corresponding lower half of the inter-phase transformer units 652, 654, 656 of the first inter-phase transformer 650. When the current flowing through the first converter 610 into an inter-phase transformer unit is equal to the current flowing through the second converter 620 into the same inter-phase transformer unit, the magnetic field generated by the currents can be neutralized.

In addition, when the current flowing through the first converter 610 into an inter-phase transformer unit is not equal to the current flowing through the second converter 620 into the same inter-phase transformer unit, the inductance generated by the winding of the inter-phase transformer unit of the first inter-phase transformer 650 can be used to restrain the current. Moreover, the structure disposition and principle between the second and third inter-phase transformers 660, 670 and the first, second and third converters 610, 620, 630 is the same as the first inter-phase transformer 650, and a detail description regarding to the second and third inter-phase transformers 660, 670 is omitted herein for the sake of brevity.

As a result, when there is a need to connect more converters in parallel to satisfy the requirement of the high-power wind energy generator, the structure of the converter system 600 as shown in FIG. 6 can be employed so as to connect the third converter 630 with the original first and second converters 610, 620 in parallel for limiting a circulating current generated by the parallel structure of the first, second and third converters 610, 620, 630 by the used of the interaction of the first, second and third inter-phase transformers 650, 660, 670 such that the converter system 600 of the embodiment of the present invention can restrain the circulating current when there is a need to connect more converters in parallel to prevent the converter system 600 from damage.

In an optional embodiment of the present invention, reference is now made to FIG. 1B to further introduce the disposition of the converter system 600 in FIG. 6. The first, second and third converters comprise a first side and a second side respectively. For example, one of the first side and second side can be an input side or an output side, and the first side and second side comprise a first bridge arm, a second bridge arm and a third bridge arm respectively. The first, second and third inter-phase transformers comprise a first inter-phase transformer unit, a second inter-phase transformer unit and a third inter-phase transformer unit respectively.

With respect to the structure, the first inter-phase transformer unit of the second inter-phase transformer is electrically connected between the first bridge arm of the first converter and the first bridge arm of the third converter, the second inter-phase transformer unit of the second inter-phase transformer is electrically connected between the second bridge arm of the first converter and the second bridge arm of the third converter, and the third inter-phase transformer unit of the second inter-phase transformer is electrically connected between the third bridge arm of the first converter and the third bridge arm of the third converter.

In addition, the first inter-phase transformer unit of the third inter-phase transformer is electrically connected between the first bridge arm of the second converter and the first bridge arm of the third converter, the second inter-phase transformer unit of the third inter-phase transformer is electrically connected between the second bridge arm of the second converter and the second bridge arm of the third converter, and the third inter-phase transformer unit of the third inter-phase transformer is electrically connected between the third bridge arm of the second converter and the third bridge arm of the third converter.

As the disposition mentioned above, when the third converter is connected to the converter system in parallel, the first, second and third inter-phase transformer can be used to restrain a circulating current generated by each two of the first, second and third converters.

In view of the foregoing embodiments of the present invention, many advantages of the present invention are now apparent. The embodiment of the present invention provides a converter system for limiting a circulating current generated by a parallel structure composed of the converters in the converter system.

Moreover, when there is a need to connect more converters in parallel to satisfy the requirement of the high-power wind energy generator, the converter system of the embodiment of the present invention can further connect external converters into the converter system in parallel to restrain a circulating current generated by the original converter system and the external converters with the use of the inter-phase transformer such that the converter system of the embodiment of the present invention can restrain the circulating current when there is a need to connect more converters in parallel to prevent the converter system from damage.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A converter system, comprising:
   a first converter;
   a second converter electrically connected to the first converter in parallel between a first input side parallel terminal and a first output side parallel terminal; and
   a first inter-phase transformer disposed at the first input side parallel terminal or the first output side parallel terminal for limiting a circulating current generated by the first converter and the second converter;
   wherein the first and second converters each comprise an input side and an output side, the input sides of the first and second converters comprise a first bridge arm, a second bridge arm and a third bridge arm respectively, the output sides of the first and second converters comprise a first bridge arm, a second bridge arm and a third bridge arm respectively, and the first inter-phase transformer comprises a first inter-phase transformer unit, a second inter-phase transformer unit and a third inter-phase transformer unit, wherein:
   when the first inter-phase transformer is disposed at the first input side parallel terminal, the first, second and third bridge arms of the input side of the first converter are electrically connected to the first, second and third inter-phase transformer units of the first inter-phase transformer respectively, wherein the first, second and third bridge arms of the input side of the second converter are electrically connected to the first, second and third inter-phase transformer units of the first inter-phase transformer respectively; and
   when the first inter-phase transformer is disposed at the first output side parallel terminal, the first, second and third bridge arms of the output side of the first converter are electrically connected to the first, second and third inter-phase transformer units of the first inter-phase transformer respectively, wherein the first, second and third bridge arms of the output side of the second converter are electrically connected to the first, second and third inter-phase transformer units of the first inter-phase transformer respectively.

2. The converter system according to claim 1, wherein the first, second and third bridge arms of the input sides of the first and second converters comprise a first wire, a second wire and a third wire respectively, and the first, second and third bridge arms of the output sides of the first and second converters comprise a first wire, a second wire and a third wire respectively, wherein:
   when the first inter-phase transformer is disposed at the first input side parallel terminal, the first wire of the input side of the first converter is winded on the upper half of the first inter-phase transformer unit in a winded direction, the second wire of the input side of the first converter is winded on the upper half of the second inter-phase transformer unit in a winded direction, and the third wire of the input side of the first converter is winded on the upper half of the third inter-phase transformer unit in a winded direction; and the first wire of the input side of the second converter is winded on the lower half of the third inter-phase transformer unit in a winded direction, the second wire of the input side of the second converter is winded on the lower half of the second inter-phase transformer unit in a winded direction, and the third wire of the input side of the second converter is winded on the lower half of the first inter-phase transformer unit in a winded direction;
   when the first inter-phase transformer is dispose at the first output side parallel terminal, the first wire of the output side of the first converter is winded on the upper half of the first inter-phase transformer unit in a winded direction, the second wire of the output side of the first converter is winded on the upper half of the second inter-phase transformer unit in a winded direction, and the third wire of the output side of the first converter is winded on the upper half of the third inter-phase transformer unit in a winded direction; and the first wire of the output side of the second converter is winded on the lower half of the third inter-phase transformer unit in a winded direction, the second wire of the output side of the second converter is winded on the lower half of the second inter-phase transformer unit in a winded direction, and the third wire of the output side of the second converter is winded on the lower half of the first inter-phase transformer unit in a winded direction.

3. The converter system according to claim 1, wherein a parallel structure of the first converter and the second converter is a parallel back-to-back converter structure.

4. The converter system according to claim 1, wherein the first converter and the second converters are electrically connected in parallel into a first converter parallel device, wherein the converter system further comprises:
   a third converter comprising an input side and an output side, wherein the third converter are electrically connected to the first converter parallel device in parallel; and
   a second inter-phase transformer, wherein:
   when the first inter-phase transformer is disposed at the first input side parallel terminal, the output side of the third converter is electrically connected to the first output side parallel terminal, and the second inter-phase transformer is electrically connected between the input side of the third converter and the first inter-phase transformer for limiting a circulating current generated by the first converter parallel device and the third converter, and
   when the first inter-phase transformer is disposed at the first output side parallel terminal, the input side of the third converter is electrically connected to the first input side parallel terminal, and the second inter-phase transformer is electrically connected between the output side of the third converter and the first inter-phase transformer for limiting a circulating current generated by the first converter parallel device and the third converter.

5. The converter system according to claim 1, wherein the first converter and the second converter are electrically connected in parallel into a first converter parallel device, wherein the converter system further comprises:
   a third converter;

a fourth converter, wherein the third converter and the fourth converter are electrically connected in parallel between a second input side parallel terminal and a second output side parallel terminal to be a second converter parallel device;

a second inter-phase transformer disposed at the second input side parallel terminal or the second output side parallel terminal for limiting a circulating current generated by the third converter and the fourth converter, wherein the first converter parallel device and the second converter parallel device are electrically connected in parallel between a generator side parallel terminal and a grid side parallel terminal; and an integrated inter-phase transformer disposed at the generator side parallel terminal or the grid side parallel terminal for limiting a circulating current generated by the first converter parallel device and the second converter parallel device.

6. The converter system according to claim 1, further comprising:

a third converter electrically connected to the first converter and the second converter in parallel between the first input side parallel terminal and the first output side parallel terminal;

a second inter-phase transformer; and a third inter-phase transformer, wherein when the first inter-phase transformer is disposed at the first input side parallel terminal, the second and third inter-phase transformers are disposed at the first input side parallel terminal, wherein the first inter-phase transformer is electrically connected between the first converter and the second converter, the second inter-phase transformer is electrically connected between the first converter and the third converter, and the third inter-phase transformer is electrically connected between the second converter and the third converter, wherein the first, second and third inter-phase transformers are operable to restrain a circulating current generated by each two of the converters, and when the first inter-phase transformer is disposed at the first output side parallel terminal, the second and third inter-phase transformers are disposed at the first output side parallel terminal, wherein the first inter-phase transformer is electrically connected between the first converter and the second converter, the second inter-phase transformer is electrically connected between the first converter and the third converter, and the third inter-phase transformer is electrically connected between the second converter and the third converter, wherein the first, second and third inter-phase transformers are operable to restrain a circulating current generated by each two of the converters.

7. The converter system according to claim 1, further comprising:

a third converter comprising an input side and an output side, wherein the first and second converters comprise an input side and an output side respectively, the input sides of the first, second and third converters comprises a first bridge arm, a second bridge arm and a third bridge arm respectively;

a second inter-phase transformer comprising a first inter-phase transformer unit, a second inter-phase transformer unit and a third inter-phase transformer unit; and a third inter-phase transformer comprising a first inter-phase transformer unit, a second inter-phase transformer unit and a third inter-phase transformer unit, wherein the first inter-phase transformer comprises a first inter-phase transformer unit, a second inter-phase transformer unit and a third inter-phase transformer unit, wherein the first bridge arm of the first converter is electrically connected to the first inter-phase transformer unit of the first inter-phase transformer and the first inter-phase transformer unit of the second inter-phase transformer, the second bridge arm of the first converter is electrically connected to the second inter-phase transformer unit of the first inter-phase transformer and the second inter-phase transformer unit of the second inter-phase transformer, and the third bridge arm of the first converter is electrically connected to the third inter-phase transformer unit of the first inter-phase transformer and the third inter-phase transformer unit of the second inter-phase transformer;

wherein the first bridge arm of the second converter is electrically connected to the first inter-phase transformer unit of the first inter-phase transformer and the first inter-phase transformer unit of the third inter-phase transformer, the second bridge arm of the second converter is electrically connected to the second inter-phase transformer unit of the first inter-phase transformer and the second inter-phase transformer unit of the third inter-phase transformer, and the third bridge arm of the second converter is electrically connected to the third inter-phase transformer unit of the first inter-phase transformer and the third inter-phase transformer unit of the third inter-phase transformer; and wherein the first bridge arm of the third converter is electrically connected to the first inter-phase transformer unit of the second inter-phase transformer and the first inter-phase transformer unit of the third inter-phase transformer, the second bridge arm of the third converter is electrically connected to the second inter-phase transformer unit of the second inter-phase transformer and the second inter-phase transformer unit of the third inter-phase transformer, and the third bridge arm of the third converter is electrically connected to the third inter-phase transformer unit of the second inter-phase transformer and the third inter-phase transformer unit of the third inter-phase transformer.

8. The converter system according to claim 7, wherein the first, second and third bridge arms of the input sides of the first, second and third converters comprise a first wire, a second wire and a third wire respectively, wherein:

the first wire of the first converter is winded on the upper half of the first inter-phase transformer unit of the first inter-phase transformer and the upper half of the first inter-phase transformer unit of the second inter-phase transformer in a winded direction, the second wire of the first converter is winded on the upper half of the second inter-phase transformer unit of the first inter-phase transformer and the upper half of the second inter-phase transformer unit of the second inter-phase transformer in a winded direction, and the third wire of the first converter is winded on the upper half of the third inter-phase transformer unit of the first inter-phase transformer and the upper half of the third inter-phase transformer unit of the second inter-phase transformer in a winded direction;

the first wire of the second converter is winded on the lower half of the first inter-phase transformer unit of the first inter-phase transformer and the upper half of the first inter-phase transformer unit of the third inter-phase transformer in a winded direction, the second wire of the second converter is winded on the lower half of the second inter-phase transformer unit of the first inter-phase transformer and the upper half of the second inter-phase transformer unit of the third inter-phase transformer in a winded direction, and the third wire of the second converter is winded on the lower half of the third inter-phase transformer unit of the first inter-phase transformer and the upper half of the third inter-phase transformer unit of the third inter-phase transformer in a winded direction; and the first wire of the third converter is winded on the lower half of the first inter-phase transformer unit of the second inter-phase transformer in a winded direction and is winded on the lower half of the first inter-phase transformer unit of the third inter-phase transformer in a winded direction, the second wire of the third converter is winded on the lower half of the second inter-phase transformer unit of the second inter-phase transformer in a winded direction and is winded on the lower half of the second inter-phase transformer unit of the third inter-phase transformer in a winded direction, and the third wire of the third converter is winded on the lower half of the third inter-phase transformer unit of the second inter-phase transformer in a winded direction and is winded on the lower half of the third inter-phase transformer unit of the third inter-phase transformer in a winded direction.

9. The converter system according to claim 1, further comprising:

a third converter comprising an input side and an output side, wherein the first and second converter comprises an input side and an output side respectively, and the output sides of the first, second and third converters comprise a first bridge arm, a second bridge arm and a third bridge arm respectively;

a second inter-phase transformer comprising a first inter-phase transformer unit, a second inter-phase transformer unit and a third inter-phase transformer unit; and a third inter-phase transformer comprising a first inter-phase transformer unit, a second inter-phase transformer unit and a third inter-phase transformer unit, wherein the first inter-phase transformer comprises a first inter-phase transformer unit, a second inter-phase transformer unit and a third inter-phase transformer unit, wherein the first bridge arm of the first converter is electrically connected to the first inter-phase transformer unit of the first inter-phase transformer and the first inter-phase transformer unit of the second inter-phase transformer, the second bridge arm of the first converter is electrically connected to the second inter-phase transformer unit of the first inter-phase transformer and the second inter-phase transformer unit of the second inter-phase transformer, and the third bridge arm of the first converter is electrically connected to the third inter-phase transformer unit of the first inter-phase transformer and the third inter-phase transformer unit of the second inter-phase transformer;

wherein the first bridge arm of the second converter is electrically connected to the first inter-phase transformer unit of the first inter-phase transformer and the first inter-phase transformer unit of the third inter-phase transformer, the second bridge arm of the second converter is electrically connected to the second inter-phase transformer unit of the first inter-phase transformer and the second inter-phase transformer unit of the third inter-phase transformer, and the third bridge arm of the second converter is electrically connected to the third inter-phase transformer unit of the first inter-phase transformer and the third inter-phase transformer unit of the third inter-phase transformer; and wherein the first bridge arm of the third converter is electrically connected to the first inter-phase transformer unit of the second inter-phase transformer and the first inter-phase transformer unit of the third inter-phase transformer, the second bridge arm of the third converter is electrically connected to the second inter-phase transformer unit of the second inter-phase transformer and the second inter-phase transformer unit of the third inter-phase transformer, and the third bridge arm of the third converter is electrically connected to the third inter-phase transformer unit of the second inter-phase transformer and the third inter-phase transformer unit of the third inter-phase transformer.

10. The converter system according to claim 9, wherein the first, second and third bridge arms of the output sides of the first, second and third converters comprise a first wire, a second wire and a third wire respectively, wherein:

the first wire of the first converter is winded on the upper half of the first inter-phase transformer unit of the first inter-phase transformer and the upper half of the first inter-phase transformer unit of the second inter-phase transformer in a winded direction, the second wire of the first converter is winded on the upper half of the second inter-phase transformer unit of the first inter-phase transformer and the upper half of the second inter-phase transformer unit of the second inter-phase transformer in a winded direction, and the third wire of the first converter is winded on the upper half of the third inter-phase transformer unit of the first inter-phase transformer and the upper half of the third inter-phase transformer unit of the second inter-phase transformer in a winded direction;

the first wire of the second converter is winded on the lower half of the first inter-phase transformer unit of the first inter-phase transformer and the upper half of the first inter-phase transformer unit of the third inter-phase transformer in a winded direction, the second wire of the second converter is winded on the lower half of the second inter-phase transformer unit of the first inter-phase transformer and the upper half of the second inter-phase transformer unit of the third inter-phase transformer in a winded direction, and the third wire of the second converter is winded on the lower half of the third inter-phase transformer unit of the first inter-phase transformer and the upper half of the third inter-phase transformer unit of the third inter-phase transformer in a winded direction; and the first wire of the third converter is winded on the lower half of the first inter-phase transformer unit of the second inter-phase transformer in a winded direction and is winded on the lower half of the first inter-phase transformer unit of the third inter-phase transformer in a winded direction, the second wire of the third converter is winded on the lower half of the second inter-phase transformer unit of the second inter-phase transformer in a winded direction and is winded on the lower half of the second inter-phase transformer unit of the third inter-phase transformer in a winded direction, and the third wire of the third converter is winded on the lower half of the third inter-phase transformer unit of the second inter-phase transformer in a winded direction and is winded on the lower half of the third inter-phase transformer unit of the third inter-phase transformer in a winded direction.

11. The converter system according to claim 1, wherein the first inter-phase transformer, the second inter-phase transformer, the third inter-phase transformer or the integrated inter-phase transformer is a three-phase N-limb cores transformer, wherein N is an integer being greater than two.

12. A converter system, comprising:
a first converter comprising a first side and a second side, wherein the first side of the first converter comprises a first bridge arm, a second bridge arm and a third bridge arm;
a second converter comprising a first side and a second side, wherein the first side of the second converter comprises a first bridge arm, a second bridge arm and a third bridge arm, and the second side of the second converter is electrically connected to the second side of the first converter; and
a first inter-phase transformer comprising a first inter-phase transformer unit, a second inter-phase transformer unit and a third inter-phase transformer unit, wherein the first inter-phase transformer unit is electrically connected between the first bridge arm of the first converter and the first bridge arm of the second converter, the second inter-phase transformer unit is electrically connected between the second bridge arm of the first converter and the second bridge arm of the second converter, and the third inter-phase transformer unit is electrically connected between the third bridge arm of the first converter and the third bridge arm of the second converter.

13. The converter system according to claim 12, further comprising:
a third converter comprising a first side and a second side, wherein the first side of the third converter comprises a first bridge arm, a second bridge arm and a third bridge arm, and the second side of the third converter is electrically connected to the second sides of the first, second converters; and
a second inter-phase transformer comprising a first inter-phase transformer unit, a second inter-phase transformer unit and a third inter-phase transformer unit;
wherein the first, second and third inter-phase transformer units of the first inter-phase transformer comprise an output terminal respectively, wherein the first inter-phase transformer unit of the second inter-phase transformer is electrically connected between the output terminal of the first inter-phase transformer unit of the first inter-phase transformer and the first bridge arm of the third converter, the second inter-phase transformer unit of the second inter-phase transformer is electrically connected between the output terminal of the second inter-phase transformer unit of the first inter-phase transformer and the second bridge arm of the third converter, and the third inter-phase transformer unit of the second inter-phase transformer is electrically connected between the output terminal of the third inter-phase transformer unit of the first inter-phase transformer and the third bridge arm of the third converter.

14. The converter system according to claim 12, further comprising:
a third converter comprising a first side and a second side, wherein the first side of the third converter comprises a first bridge arm, a second bridge arm and a third bridge arm;
a fourth converter comprising a first side and a second side, wherein the first side of the fourth converter comprises a first bridge arm, a second bridge arm and a third bridge arm, and the second side of the fourth converter is electrically connected to the second side of the third converter;
a second inter-phase transformer comprising a first inter-phase transformer unit, a second inter-phase transformer unit and a third inter-phase transformer unit, wherein the first inter-phase transformer unit of the second inter-phase transformer is electrically connected between the first bridge arm of the third converter and the first bridge arm of the fourth converter, the second inter-phase transformer unit of the second inter-phase transformer is electrically connected between the second bridge arm of the third converter and the second bridge arm of the fourth converter, and the third inter-phase transformer unit of the second inter-phase transformer is electrically connected between the third bridge arm of the third converter and the third bridge arm of the fourth converter; and
an integrated inter-phase transformer comprising a first inter-phase transformer unit, a second inter-phase transformer unit and a third inter-phase transformer unit, wherein the first, second and third inter-phase transformer units of the first inter-phase transformer comprise an output terminal respectively, and the first, second and third inter-phase transformer units of the second inter-phase transformer comprise an output terminal respectively, wherein the first inter-phase transformer unit of the integrated inter-phase transformer is electrically connected between the output terminal of the first inter-phase transformer unit of the first inter-phase transformer and the output terminal of the first inter-phase transformer unit of the second inter-phase transformer, the second inter-phase transformer unit of the integrated inter-phase transformer is electrically connected between the output terminal of the second inter-phase transformer unit of the first inter-phase transformer and the output terminal of the second inter-phase transformer unit of the second inter-phase transformer, and the third inter-phase transformer unit of the integrated inter-phase transformer is electrically connected between the output terminal of the third inter-phase transformer unit of the first inter-phase transformer and the output terminal of the third inter-phase transformer unit of the second inter-phase transformer.

15. The converter system according to claim 12, further comprising:
a third converter comprising a first side and a second side, wherein the first side of the third converter comprises a first bridge arm, a second bridge arm and a third bridge arm;
a second inter-phase transformer comprising a first inter-phase transformer unit, a second inter-phase transformer unit and a third inter-phase transformer unit, wherein the first inter-phase transformer unit of the second inter-phase transformer is electrically connected between the first bridge arm of the first converter and the first bridge arm of the third converter, the second inter-phase transformer unit of the second inter-phase transformer is electrically connected between the second bridge arm of the first converter and the second bridge arm of the third converter, and the third inter-phase transformer unit of the second inter-phase transformer is electrically connected between the third bridge arm of the third bridge arm and the third bridge arm of the first converter; and
a third inter-phase transformer comprising a first inter-phase transformer unit, a second inter-phase transformer unit and a third inter-phase transformer unit, wherein the first inter-phase transformer unit of the third inter-phase transformer is electrically connected between the first bridge arm of the second converter and the first bridge arm of the third converter, the second inter-phase transformer unit of the third inter-phase transformer is electrically connected between the second bridge arm of the second converter and the second bridge arm of the third converter, the third inter-phase transformer unit of the third inter-phase transformer is electrically connected between the third bridge arm of the second converter and the third bridge arm of the third converter.

16. The converter system according to claim 12, wherein the first inter-phase transformer, the second inter-phase transformer, the third inter-phase transformer or the integrated inter-phase transformer is a three-phase N-limb cores transformer, wherein N is an integer greater than two.

* * * * *